US012197601B2

(12) United States Patent
Wang et al.

(10) Patent No.: US 12,197,601 B2
(45) Date of Patent: Jan. 14, 2025

(54) HARDWARE OFFLOAD CIRCUITRY

(71) Applicant: Intel Corporation, Santa Clara, CA (US)

(72) Inventors: Ren Wang, Portland, OR (US); Sameh Gobriel, Dublin, CA (US); Somnath Paul, Hillsboro, OR (US); Yipeng Wang, Portland, OR (US); Priya Autee, Chandler, AZ (US); Abhirupa Layek, Chandler, AZ (US); Shaman Narayana, Chandler, AZ (US); Edwin Verplanke, Queen Creek, AZ (US); Mrittika Ganguli, Chandler, AZ (US); Jr-Shian Tsai, Portland, OR (US); Anton Sorokin, Portland, OR (US); Suvadeep Banerjee, San Jose, CA (US); Abhijit Davare, Hillsboro, OR (US); Desmond Kirkpatrick, Portland, OR (US); Rajesh M. Sankaran, Portland, OR (US); Jaykant B. Timbadiya, Amreli Gujrat (IN); Sriram Kabisthalam Muthukumar, Bengaluru (IN); Narayan Ranganathan, Bangalore (IN); Nalini Murari, Hillsboro, OR (US); Brinda Ganesh, Portland, OR (US); Nilesh Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 17/560,193

(22) Filed: Dec. 22, 2021

(65) Prior Publication Data

US 2022/0114270 A1    Apr. 14, 2022

Related U.S. Application Data

(60) Provisional application No. 63/130,663, filed on Dec. 26, 2020.

(51) Int. Cl.
*G06F 15/78*    (2006.01)
*G06F 9/50*    (2006.01)
(Continued)

(52) U.S. Cl.
CPC .................................. *G06F 21/62* (2013.01)

(58) Field of Classification Search
CPC .. G06F 21/62; G06F 15/7821; G06F 15/7889; G06F 2209/509; G06F 15/7807; G06F 9/5027; G06F 21/72
See application file for complete search history.

(56) References Cited

U.S. PATENT DOCUMENTS

| 2018/0322390 | A1* | 11/2018 | Das | G06F 9/30014 |
|---|---|---|---|---|
| 2019/0317802 | A1* | 10/2019 | Bachmutsky | G06F 9/5044 |
| 2021/0374162 | A1* | 12/2021 | Kirdey | G06F 40/30 |

OTHER PUBLICATIONS

Bentley, Jon Louis, "Multidimensional divide-and-conquer", Communications of the ACM, vol. 23, Issue 4, https://doi.org/10.1145/358841.358850, Apr. 1980, pp. 214-229.

(Continued)

*Primary Examiner* — Joseph P Hirl
*Assistant Examiner* — Aayush Aryal
(74) *Attorney, Agent, or Firm* — Compass IP Law PC

(57) ABSTRACT

Examples described herein relate to offload circuitry comprising one or more compute engines that are configurable to perform a workload offloaded from a process executed by a processor based on a descriptor particular to the workload. In some examples, the offload circuitry is configurable to perform the workload, among multiple different workloads. In some examples, the multiple different workloads include one or more of: data transformation (DT) for data format conversion, Locality Sensitive Hashing (LSH) for neural network (NN), similarity search, sparse general matrix-matrix multiplication (SpGEMM) acceleration of hash (Continued)

based sparse matrix multiplication, data encode, data decode, or embedding lookup.

22 Claims, 29 Drawing Sheets

(51) Int. Cl.
*G06F 21/62* (2013.01)
*G06F 21/72* (2013.01)

(56) References Cited

OTHER PUBLICATIONS

Gupta, Udit et al., "The Architectural Implications of Facebook's DNN-based Personalized Recommendation", 2019, 14 pages.
HPCA Submission, "QEI: Query Acceleration Can be Generic and Efficient in the Cloud", 2021, 14 pages.
Jegou, Herve et al., "Faiss: A library for efficient similarity search", https://engineering.fb.com/2017/03/29/data-infrastructure/faiss-a-library-for-efficient-similarity-search/, Mar. 29, 2017, 7 pages.
Ke, Liu et al., "RecNMP: Accelerating Personalized Recommendation with Near-Memory Processing", Dec. 2019, 14 pages.
Pourhabibi, Arash et al., "Optimus Prime: Accelerating Data Transformation in Servers", ASPLOS '20, Mar. 16-20, 2020, Lausanne, Switzerland, 14 pages.
Sun, Philip, "Announcing ScaNN: Efficient Vector Similarity Search", https://ai.googleblog.com/2020/07/announcing-scann-efficient-vector.html, Jul. 28, 2020, 7 pages.
University of Bristol, "What is a Voronoi diagram?", https://www.bristol.ac.uk/maths/fry-building/public-art-strategy/what-is-a-voronoi-diagram/, May 2020, 2 pages.
Vaidya, Pravin M., "AnO(n logn) algorithm for the all-nearest-neighbors Problem", http://rd.springer.com/article/10.1007/BF02187718, Mar. 1989, 15 pages.
Yuan, Yifan et al. "QEI: Query Acceleration Can be Generic and Efficient in the Cloud," 2021 IEEE International Symposium on High-Performance Computer Architecture (HPCA), Seoul, Korea (South), 2021, 14 pages.
Yuan, Yifan et al., "HALO: Accelerating Flow Classification for Scalable Packet Processing in NFV", 2019 ACM/IEEE 46th Annual International Symposium on Computer Architecture (ISCA), Phoenix, AZ, USA, Jun. 2019, 14 pages.
Extended European Search Report for Patent Application No. 21217626.7, Mailed May 10, 2022, 8 pages.
Dong, Wei et al., "Efficient K-Nearest Neighbor Graph Construction for Generic Similarity Measures", WWW'11: Proceedings of the 20th international conference on World wide web, Mar. 2011, 10 pages.
Kaul, Himanshu et al., "14.4 A 21.5M-query-vectors/s 3.37nJ/vector reconfigurable k-nearest-neighbor accelerator with adaptive precision in 14nm tri-gate CMOS," 2016 IEEE International Solid-State Circuits Conference (ISSCC), San Francisco, CA, USA, 2016, pp. 260-261.

* cited by examiner

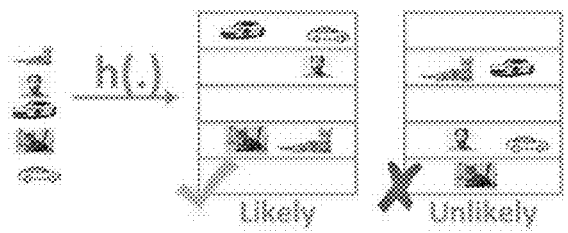
FIG. 2
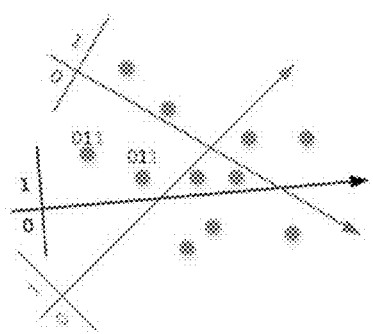
FIG. 3
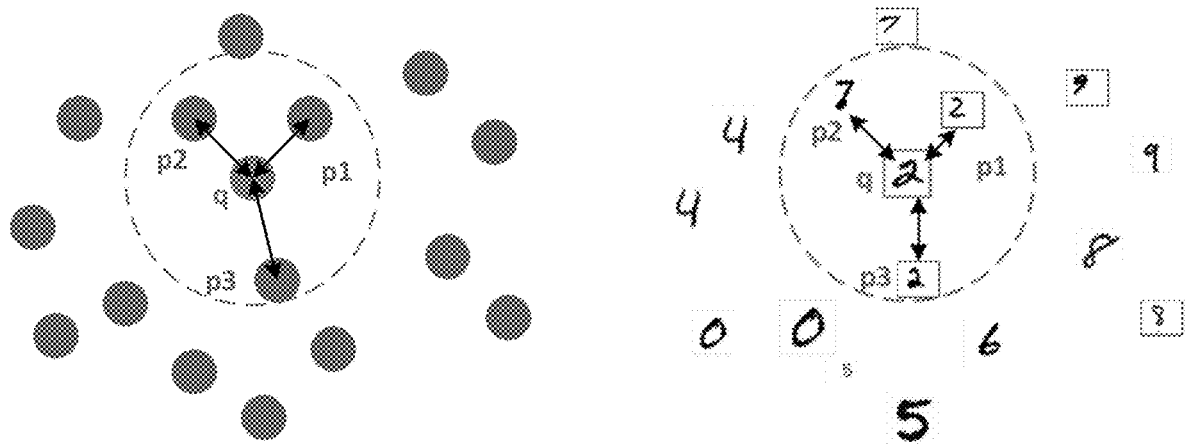
FIG. 4A  FIG. 4B

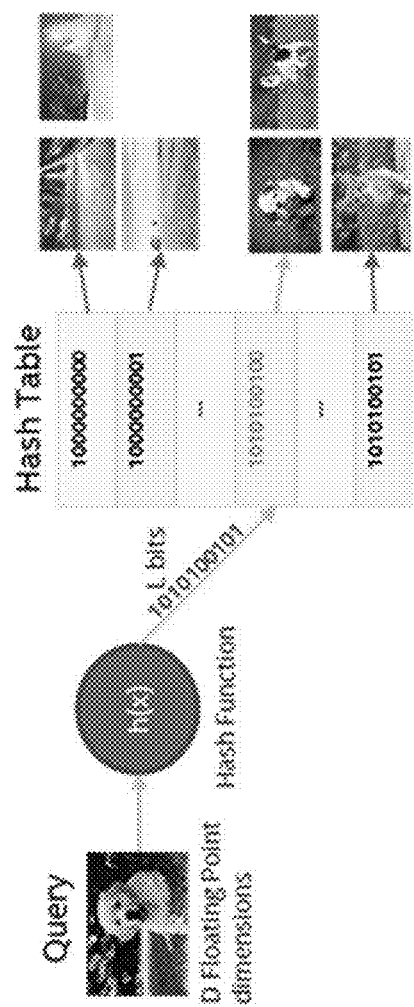
FIG. 5
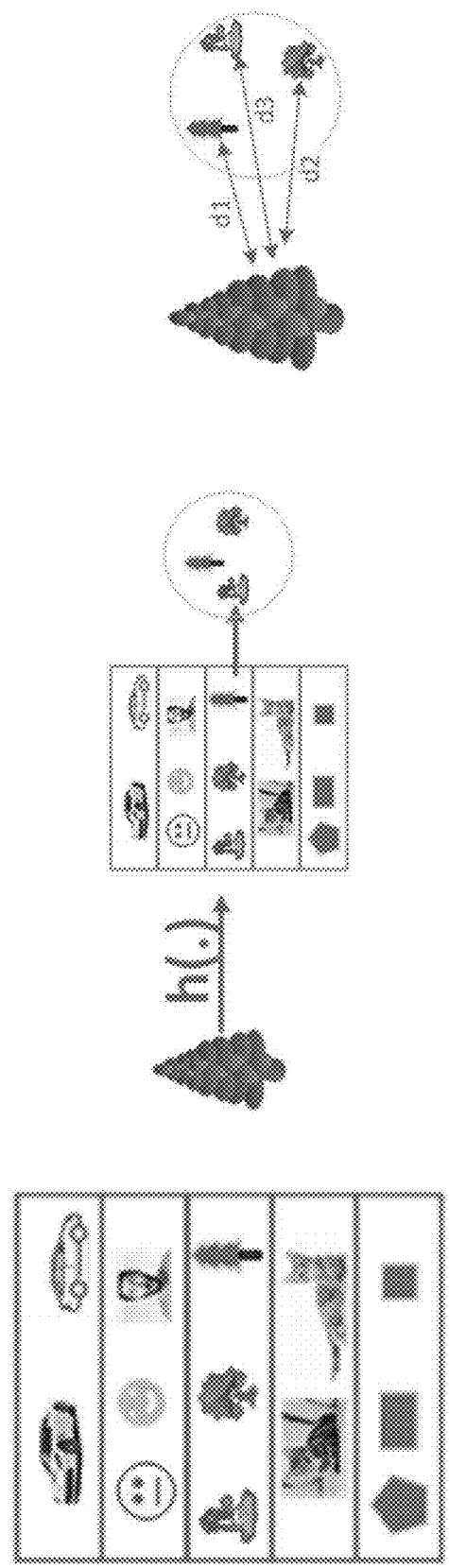
FIG. 6C
FIG. 6B
FIG. 6A

Serialization:

| Byte7 | Byte6 | Byte5 | Byte4 | Byte3 | Byte2 | Byte1 | Byte0 | bytes |
|---|---|---|---|---|---|---|---|---|
| Operation | | Flags | | Reserved | | PASID | | 0 |
| Completion Record Address | | | | | | | | 8 |
| Transformation Map Address | | | | | | | | 16 |
| Serialized Buffer Address | | | | | | | | 24 |
| | | | | | Transformation Map Size | | | 32 |
| | | | | | Serialized Buffer Size | | | 40 |
| Completion Interrupt Handle | | | Reserved | | | | | 48 |
| Reserved | | | | | | | | 56 |

De-serialization:

| Byte7 | Byte6 | Byte5 | Byte4 | Byte3 | Byte2 | Byte1 | Byte0 | bytes |
|---|---|---|---|---|---|---|---|---|
| Operation | | Flags | | Reserved | | PASID | | 0 |
| Completion Record Address | | | | | | | | 8 |
| Address of the transformation map | | | | | | | | 16 |
| Address of output staging buffer | | | | | | | | 24 |
| Serialized String Address | | | | | | | | 32 |
| | | | | | Transformation Map Size | | | 40 |
| | | | | | Output Staging Buffer Size | | | 48 |
| Completion Interrupt Handle | | | Serialized String Size | | | | | 56 |

Batch:

| Byte7 | Byte6 | Byte5 | Byte4 | Byte3 | Byte2 | Byte1 | Byte0 | bytes |
|---|---|---|---|---|---|---|---|---|
| Operation | | Flags | | Reserved | | PASID | | 0 |
| Completion Record Address | | | | | | | | 8 |
| Descriptor List Address | | | | | | | | 16 |
| | | | | | Request count | | | 24 |
| Reserved | | | | | | | | 32 |
| | | | | | | | | 40 |
| Completion Interrupt Handle | | | | | | | | 48 |
| | | | | | | | | 56 |

FIG. 17

HARDWARE OFFLOAD CIRCUITRY

RELATED APPLICATION

The present application claims the benefit of priority of U.S. Provisional application Ser. No. 63/130,663, filed Dec. 26, 2020. The contents of that application is incorporated herein in its entirety.

BACKGROUND

Cloud computing has become a popular paradigm for developing and deploying computing services in data centers. The combination of diverse applications and cloud infrastructure creates challenges for both the service providers and the chip makers in improving the performance and efficiency of data center hardware. Specialized accelerators, such as field programmable gate arrays (FPGAs) and graphics processing units (GPUs), improve the performance and efficiency of important parts (compute kernels) of cloud workloads. These accelerators are usually connected to the central processing unit (CPU) via a device interface.

BRIEF DESCRIPTION OF THE DRAWINGS

FIG. 2 shows LSH used in dimension reduction of inputs.

FIG. 3 shows an example of LSH function using random projection.

FIG. 4A depicts the KNN similarity search operation.

FIG. 4B illustrates the problem for an example of finding the similar images.

FIG. 5 illustrates use of LSH to Cluster Objects into Buckets.

FIGS. 6A-6C depicts an example of hierarchical LSH technology.

FIG. 17 depicts an example of descriptor formats.

DETAILED DESCRIPTION

Figure 1A:
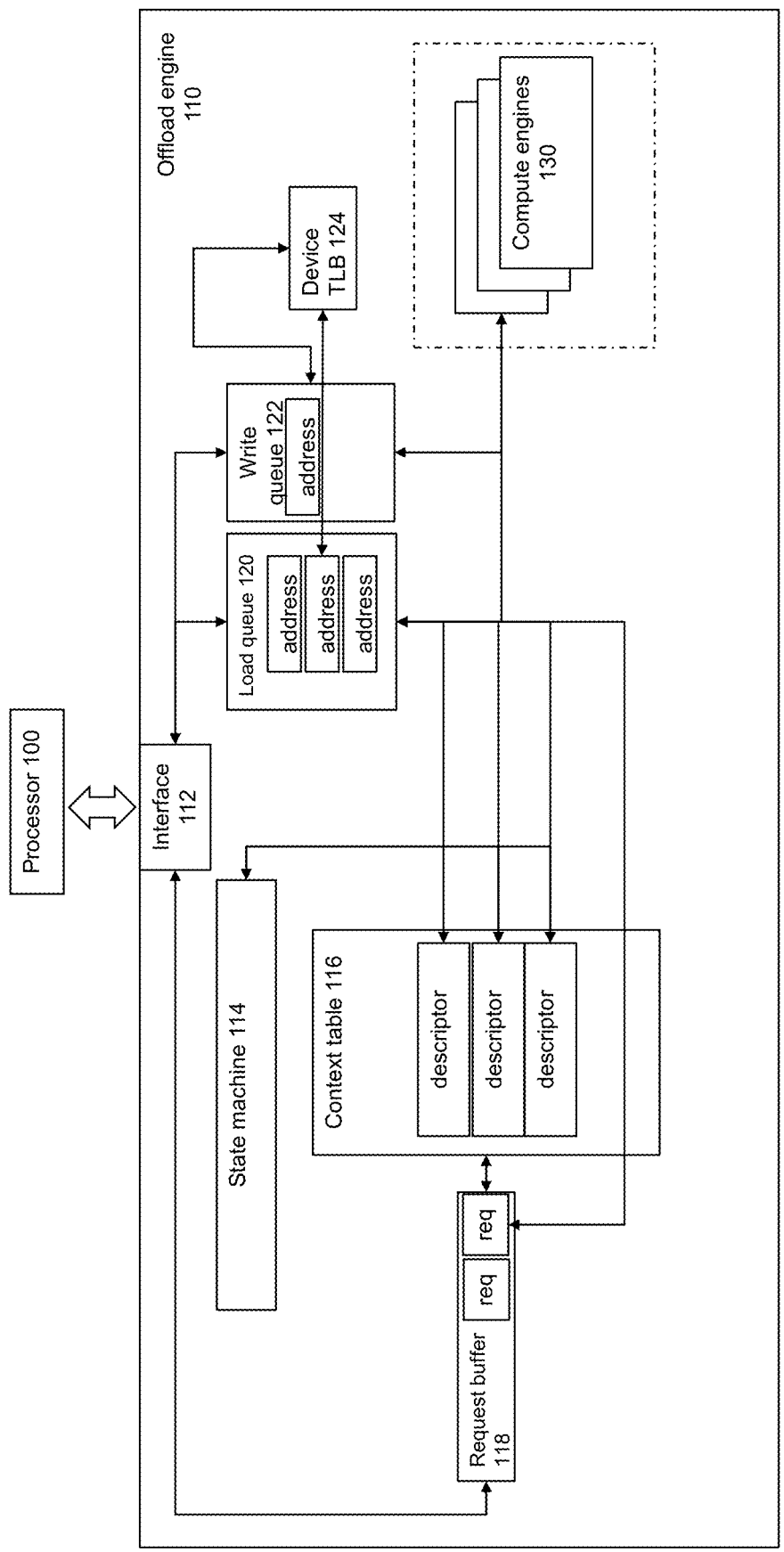
FIG. 1A depicts an example system.

FIG. 1A depicts an example system. Processor 100 can execute software such as application, virtual machine (VM), container, microservice, and others that offload performance of tasks from processor 100 to offload engine 110. As described herein, offloaded workloads can at least include data transformation (DT) for data format conversion (e.g., for remote procedure calls (RPC), Locality Sensitive Hashing (LSH) for neural network (NN) or similarity search, sparse general matrix-matrix multiplication (SpGEMM) acceleration of hash based sparse matrix multiplication, data encode or decode, embedding lookup, and other operations. For example, software executing on processor 100 can cause offload engine 110 to access descriptors and metadata that provide workload information and configuration (e.g., field level parallelism, internal memory, transformation map for deserialization, and others) to access data structures (e.g., linked list, hash table, Protobuf data structures as data types) to perform offloaded workloads.

Example fields of a descriptor are shown in the table below.

| Field | Example description |
|---|---|
| starting address | Starting address of table |
| data structure type | Chained hash table, non-chained hash table, skip list, linked list |
| sub type | Non-chained hash table: signature + key-value index, no-signature + embedded key, signature + key pointer. Chained-hash table: no signature + embedded key, no signature + key pointer |
| key index/pointer offset | For embedded key, location of key. For key value (kv) index type, location of index. For pointer type, location of pointer. |
| global key length | Use or do not use variable key length. |

Offload engine circuitry 110 can utilize interface 112 to communicate with processor 100 and other devices not shown such as memory, storage, a network interface device, and so forth. Interface 112 can include a device interface such as Peripheral Component Interconnect express (PCIe) or Compute Express Link (CXL).

State machine 114 can configure operations of circuitry and processors of offload engine 110 depending on the workload to be performed. A descriptor can specify a particular offloaded operation to be performed by offload engine 110 and configuration applied by state machine 114.

Context table 116 can store workload descriptors that are referenced by requests stored in request buffer 118. Load queue 120 can store memory addresses in system or remote memory of data or other information to be loaded into offload engine 110. Write queue 122 can store one or more memory addresses in system or remote memory in which data or other information generated by offload engine 110 is to be stored. Device translation lookaside buffer (TLB) 124 can store translations of virtual memory to physical memory addresses for use in connection with memory read or write operations.

Compute engines 130 can be configured by state machine 114 to perform a workload identified by a descriptor. For example, workloads can at least include DT for data format conversion, LSH for NN or similarity search, SpGEMM acceleration of hash based sparse matrix multiplication, data encode or decode, embedding lookup, and other operations.

Offload engine 110 can be implemented using one or more of: processors, circuits, application specific integrated circuits (ASICs), programmable logic devices (PLDs), field programmable gate arrays (FPGAs), memory devices, cache devices, logic gates, registers, and so forth.

Figure 1B:
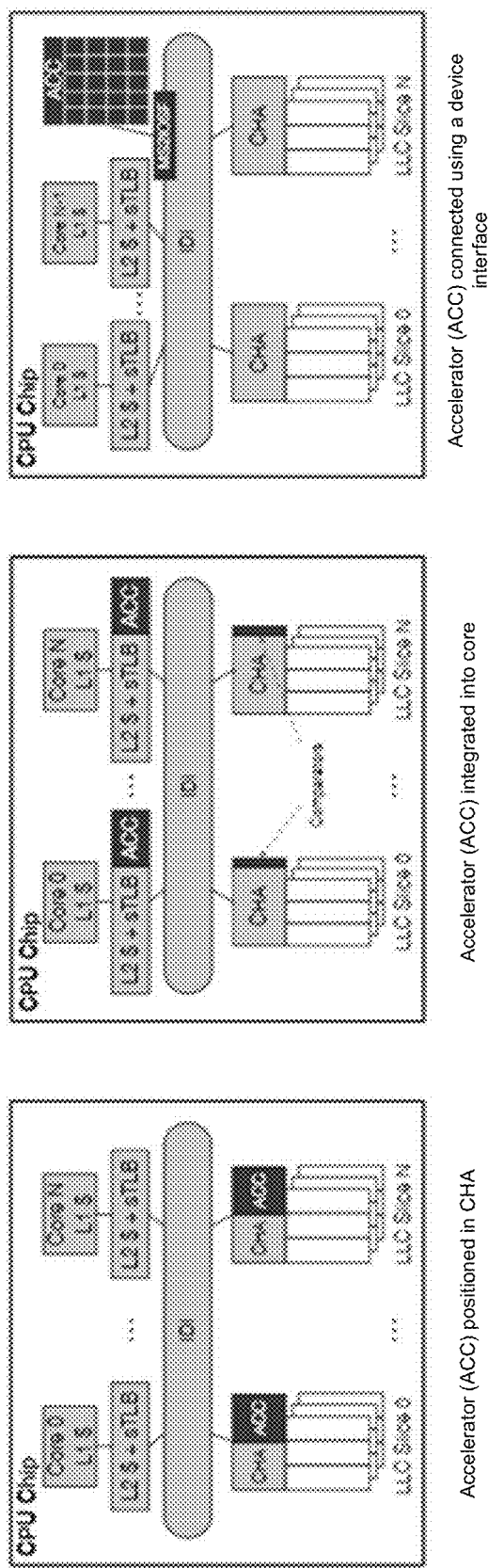
FIGS. 1B and 1C illustrate examples of accelerator placement.

FIG. 1B illustrates examples of locations of the offload engine (accelerator). The accelerator can be integrated into a CHA (cache and home agent), integrated into a core, or connected using a device interface. The accelerator can be located within the core where it can be a co-processor or accessed with dedicated ISA. The accelerator can be located within the CHA (cache and home agent) in LLC where access can be triggered by either ISA or device driver models in the core and enabled using internal fabric opcodes. The accelerator can be located dedicated accelerator existing within the SoC or outside the SoC in memory.

Figure 1C:
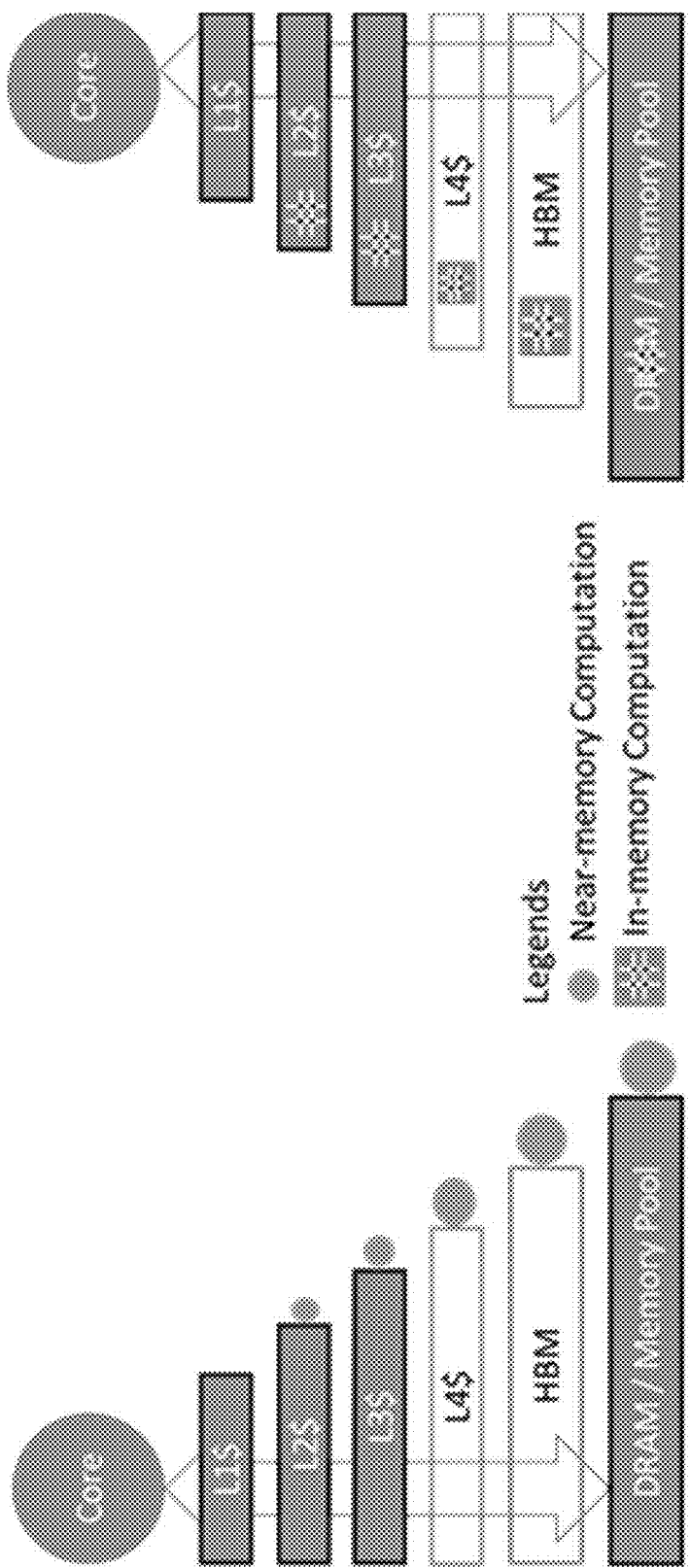

FIG. 1C illustrates that the offload engine can be placed in various parts of a memory hierarchy. Offload engine can be placed adjacent to caching agents and memory controller agents managing a memory channel or those managing a memory pool or offload engine can be embedded within the memory fabric of the cache or memory. In some examples, offload engine can be adjacent to or embedded in memory of one or more tiers, such as level 1 (L1), level 2 (L2), level 3 (L3), level 4 (L4), High Bandwidth Memory (HBM), or a memory pool.

An offload engine can be placed in at least two levels of memory (alternatively referred to herein as "2LM") that includes cached subsets of system disk level storage (in addition to, for example, run-time data). This main memory includes a first level (alternatively referred to herein as "near memory") including smaller faster memory made of, for example, dynamic random access memory (DRAM) or other volatile memory; and a second level (alternatively referred to herein as "far memory") which includes larger and slower (with respect to the near memory) volatile memory (e.g., DRAM) or nonvolatile memory storage (e.g., flash memory or byte addressable non-volatile memory (e.g., Intel Optane®)). The far memory is presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory).

A pooled memory can be included in far memory. Pooled memory can include one or more dual in-line memory modules (DIMMs), or other volatile or non-volatile memory devices. In some examples, the offload engine can be used as part of or accessible to a pooled memory controller, pooled memory switch which communicates with multiple pooled memory drawers and/or other devices, and/or pooled memory Caching Agent (CA), pooled memory Home Agent (HA), pooled memory Caching/Home Agent (CHA), or equivalent circuitry that attempts to achieve cache coherence.

In some examples, for particular addressable memory ranges accessible to particular processor sockets, an HA can attempt to achieve data consistency among the memory devices and caches of processor sockets so that different processors can access a same version of data. An HA could be responsible for tracking access to content of cacheable lines that were stored in a memory pool. Where another processor has access to a same cache line and corresponding memory address, a CA can provide data from its cache slice or obtain a copy of data from another processor's cache to attempt to achieve data consistency among memory devices and caches of processor sockets.

Locality Sensitive Hashing (Lsh) used in Approximate Solution of Knn Image Similarity Search A common query used workloads is K-Nearest Neighbors (KNNs) similarity search. The KNN search problem arises in many use cases including: Pattern Recognition, Recommendation Systems, Computer Vision, Computational Geometry, Visual Databases, to mention a few. Using KNN, given a query (e.g., image), the result is to retrieve the K-closest items (e.g., images) in a database. As the database becomes larger and/or when the dimension of the images increase, central processing unit (CPU) cycles (e.g., computing hashing and pruning the results) and memory resources (e.g., from accessing many hash tables) to perform this search can increase, as can latency to complete a search. Locality Sensitive Hash (LSH) can be used to find a set of (likely) similar items for further processing.

Locality-sensitive hashing (LSH) is a hashing mechanism that hash similar inputs (not identical) to a same bucket with high probability. LSH aims to maximize the probability of a "collision" for similar items to achieve dimension reduction of inputs in high dimensional spaces and categorize inputs in high dimensional spaces into buckets of low dimension signatures. LSH hashing function cluster objects into buckets of similar items to reduce a candidate set.

As shown in FIG. 2, LSH has been used in dimension reduction of inputs in high dimensional spaces and categorize them into buckets of low dimension signatures. For example, high dimensional images are hashed into "clustering buckets," LSH hash functions will typically cluster similar-enough images into the same buckets. For example, it is more likely that two car images hash into the same bucket rather than a car and cat images hash together.

Hashing functions (e.g., random projection, minwise hashing, bitsampling hashing, etc.) are used to implement LSH. Each function works for certain inputs and for certain similarity measures (e.g., cosine similarity, hamming similarity, etc.). For example, a simple LSH function using random projection, is shown in FIG. 3, where data points in D dimensions are projected on a random plane and each projection will result in 1 bit (1 if above the plane and 0 if below it), for K projections a signature of K-bits are produced. Two data points will fall into same bucket if they have the same K-bit signature.

One of the queries supported by many applications is (K-Nearest Neighbors) KNNs similarity search retrieval. Similarity search retrieval is used in many applications (e.g., object recognition, image annotation, label classifications, etc.). For a KNN query and given a query item (e.g., a query image), the system could retrieve the K-closest items (e.g., images) in the database to the input query FIG. 4A depicts the KNN similarity search computation problem: given a collection of "n" objects each of size "d" dimensions, and then given an unlabeled query object "q", the return set is a set of "K" labeled objects "p1", "p2" and "p3" (K=3 in this example) where these objects are most similar to "q", under some notion of similarity (e.g., Euclidean distance, Hamming distance, Cosine similarity distance, . . . etc.).

FIG. 4B illustrates the problem for an example of finding the similar images. In this example the query is an image (20×20 pixel) of a handwritten digit 2 and the retrieval set is the 3 closest images in the databases. The similarity measure in this example is the hamming distance (number of pixels different from one image to the other). As shown, the return set in this example are 2 images for handwritten digit 2 and one image for handwritten digit 7 that looks like a digit 2.

KNNs involve comparing a query object with every object in the database and then sorting the results based on how similar they are. As shown in Table 1, if the database is not indexed then the query time, the space to store the database is proportional to the total number of objects (n) and the dimension of the objects (d). If the database is fully indexed (e.g., using a Voronoi diagram) then the query time is reduced to be proportional to the dimension d and the logarithmic of n the storage of the full index is a polynomial in n. Query time and storage space challenges increase the number of objects in the database and with increasing dimension of each object (e.g., 4K feature vectors used for high dimensional images).

Some solutions utilize an approximate KNN graph and techniques such as space partition tree, and local search which in high-level they recursively divides the data objects into neighbor sets and then given a query only the local set is search.

FIG. 5 illustrates use of LSH to Cluster Objects into Buckets. Locality Sensitive Hashing (LSH) can be used to cluster the objects into buckets of "similar" data. An LSH hash function (e.g., random projection hash) can be used to generate a signature of the objects in the database. A signature size is "L" bits, where L«d. Objects with similar signatures can cluster together into the same hash bucket (e.g., divide the whole data set into small groups). As a result, given a new query object, the same hash function is used to generate a signature of the query pointing to a specific bucket and the items in that bucket are the closest neighbor to the input query. To increase the accuracy of this solution, some examples use different hash tables with a different hash functions and the union of the objects of buckets pointed to by the query are the approximate nearest neighbors.

Accuracy of the LSH scheme to retrieve the KNN set can depend on the distribution of the input data, the hash function used, and whether the generated signature (L bits) is representable enough of the actual data (d bits). To improve the accuracy of KNN image similarity using LSH, a bigger candidate list can be formed. The candidate list of size "C" (C>K & C«n; where n is the total number of items in the database). Then the candidate list can be pruned to find the top K nearest neighbor. The pruning of the candidate list can use the original dimension of the input (d) and not the signature and hence will provide higher accuracy. The distance measure here depends on the application, and different distances can be used (e.g., L2 Euclidean Distance, Hamming Distance, Cosine Distance, etc.)

FIGS. 6A-6C depicts an example of hierarchical LSH technology. As shown in FIG. 6A, the first operation is to index the input data using the LSH hash function and to generate the LSH index where each bucket will contain similar objects. Given a query image, the KNN similarity problem is divided into two phases. Phase 1, shown in FIG. 6B and uses the LSH index to generate the top C (candidate list) closer to the query object (a larger set than nearest K neighbors). Phase 2, shown in FIG. 6C, the candidate list is pruned, and query image is compared pairwise with every object in the candidate list on the original "d" dimension and sorted to pick the nearest K neighbors.

To increase the accuracy of LSH, even further, the candidate list can be significantly larger. One technique to increase the number of candidates is to extend a hierarchical LSH from one hash table to a series of hash tables, using its unique hash function. Each table can provide a subset of the candidates, and the final set is the union of all the candidates from all the tables.

Figure 7:
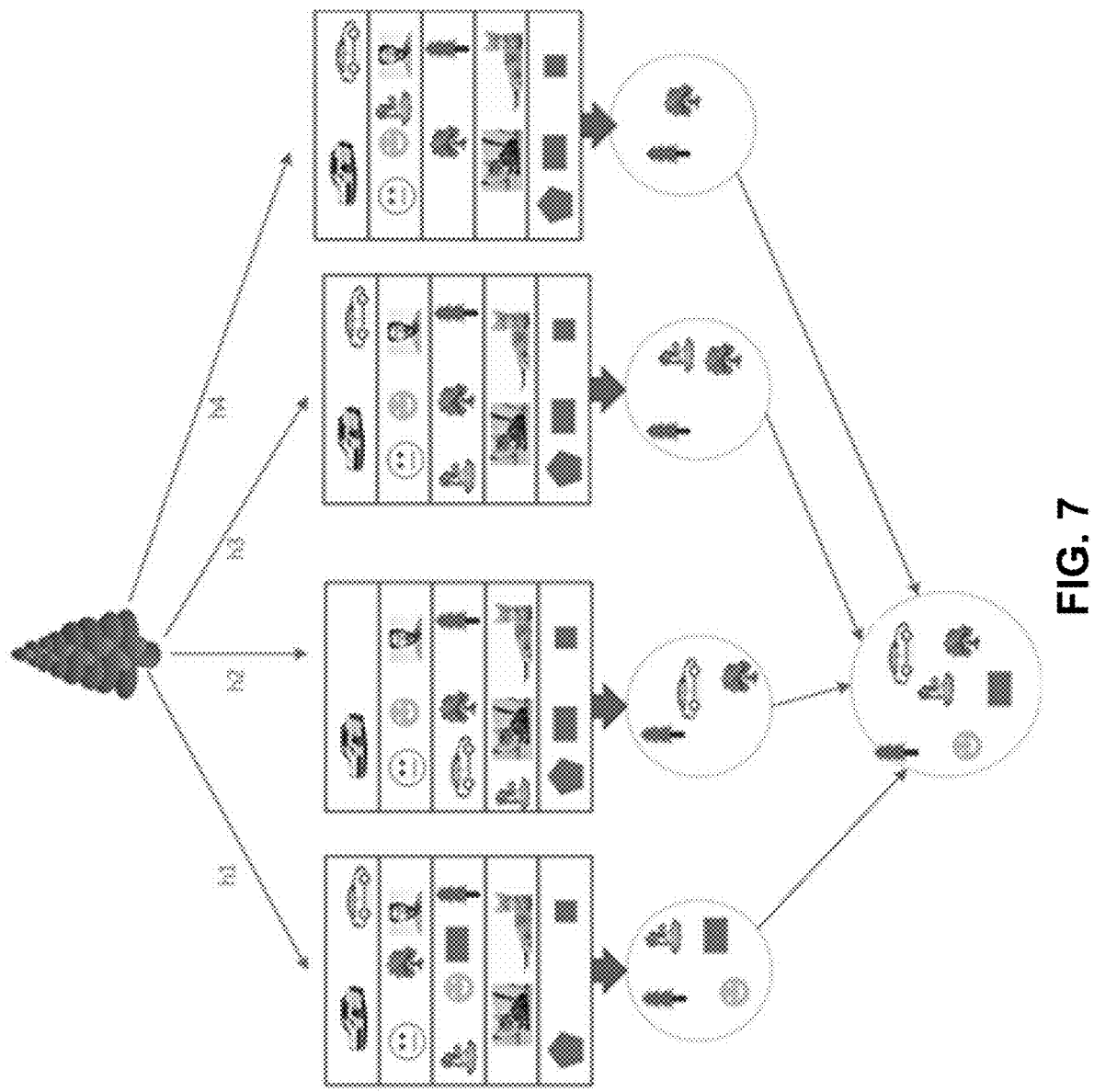
FIG. 7 depicts a hierarchical LSH with Multiple Hash Tables.

FIG. 7 depicts a hierarchical LSH with Multiple Hash Tables. In the tables of FIG. 7, 4 LSH index tables are accessed with h1 to h4 using different LSH hash functions. A potential concern with growing the size of the candidate list is that the cost of hash table access and candidate list pruning becomes significantly larger, which can increase query time and increase the latency and is bottlenecked with the limited memory bandwidth.

Some examples provide a hardware acceleration to offload the LSH operations to an accelerator. Some examples configure a hardware offload engine to perform LSH from accessing a series of hash tables in near memory fashion. The offload engine can perform a hashing algorithm, search hash tables, form a candidate list, perform list pruning, and return the nearest neighbors set to the requesting thread. Offloading LSH to a hardware engine can alleviate many of the CPU and memory bottlenecks and hence can significantly improve accuracy and processing speed for different applications.

Some examples provide hardware and software solutions to reduce a time to execute data query and transformation workloads. The accelerator can determine a subset (e.g., a smaller number of samples) as candidates for a second stage, to potentially avoid computing distances and comparing them on all samples. To perform the second stage, the accelerator can compute one or more distances and find K nearest neighbors.

Figure 8:
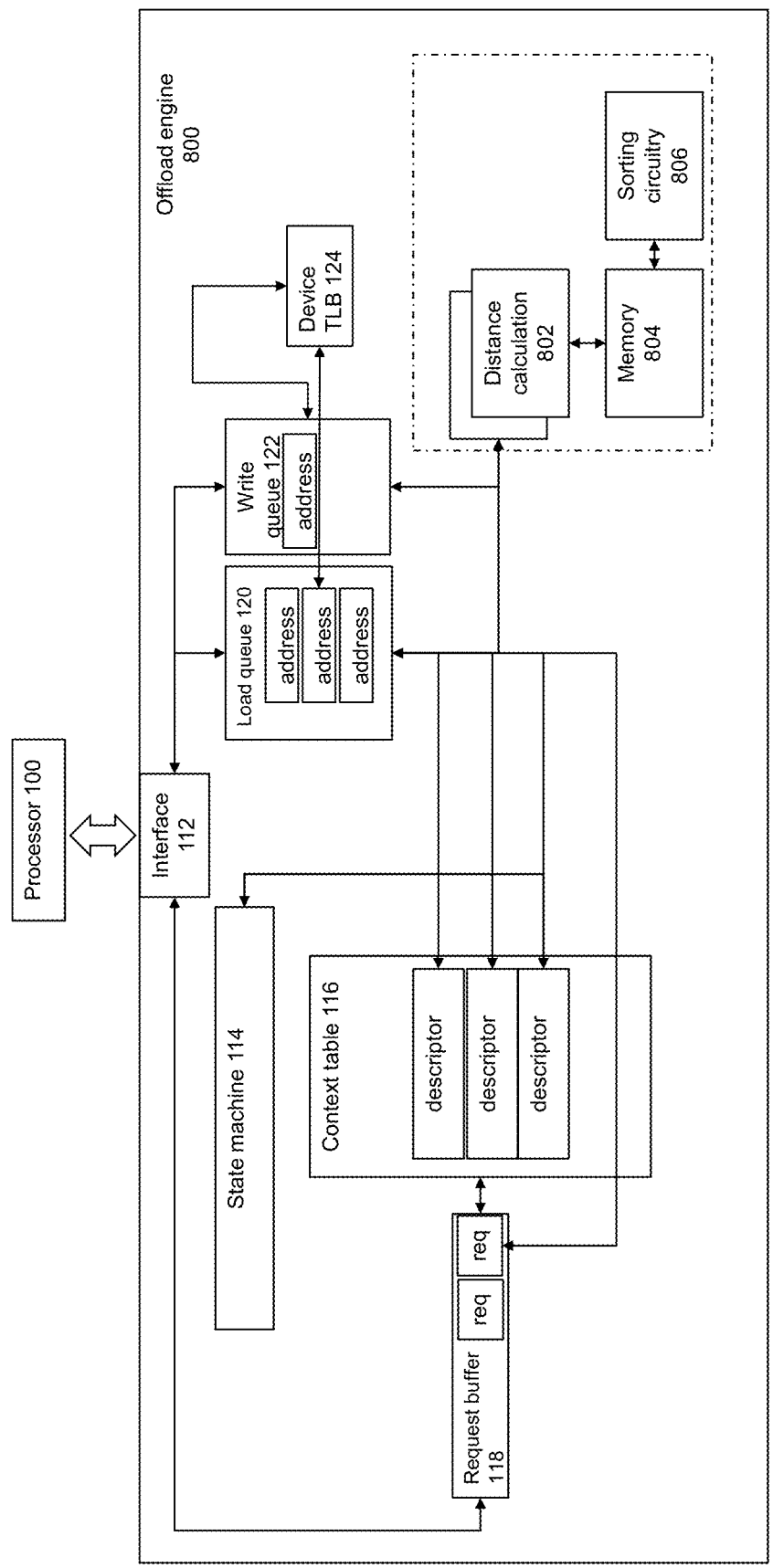
FIG. 8 depicts an example system.

FIG. 8 depicts an example system. For created LSH index tables, when an application requests a similarity search, the application sends a descriptor as a request to the accelerator by writing to a descriptor queue in memory. A descriptor can include an address of the queried key (e.g., image), the addresses of the hash tables, and address of the result buffer. Request buffer can store one or more requests associated with descriptors. A processor can send a request for offload engine 800 to process and a descriptor can refer to a specific command format of the request contains.

Load queue 120 can read a data structure of addresses of keys and/or entries hash tables to be read and processed by offload engine 800. Keys and/or entries from one or more hash tables can be stored in memory 804 for processing by distance calculation circuitry 802 in parallel. Distance calculation circuitry 802 can iterate through the keys in the entry, where a key is used to retrieve one or more candidates. The candidates can be read into one or more of distance calculation circuitry 802 to determine distance from a candidate to the corresponding key. While candidates and their distances are calculated by one or more instances of distance calculation circuitry 802, sorting circuitry 806 can sort the candidates in descending order with regard to the distance to the query key. The top-k closest candidates from the list can written back to a result buffer in host memory that is allocated by software executed by processor 100. Write queue 122 can store addresses of a result buffer in which to write results from computation by offload engine 810.

The following provides an example of a recommend engine of movies to suggest to viewers. Candidate movies can be identified by feature metadata and a feature vector can include multiple features (e.g., director, actor, genre). The hash table can include a candidate list. A descriptor can include pointers to a feature key, LSH hash tables and hash function to use. The accelerator can parse pointers to feature vector and LSH hash tables and determine which value bucket to fetch into memory 804. Parallel distance calculation engine 802 can perform distance calculation in parallel to determine distances of candidates from the original queried key. Sorting circuitry 806 can identify the k candidates that are closest to the queried key.

Figure 9:
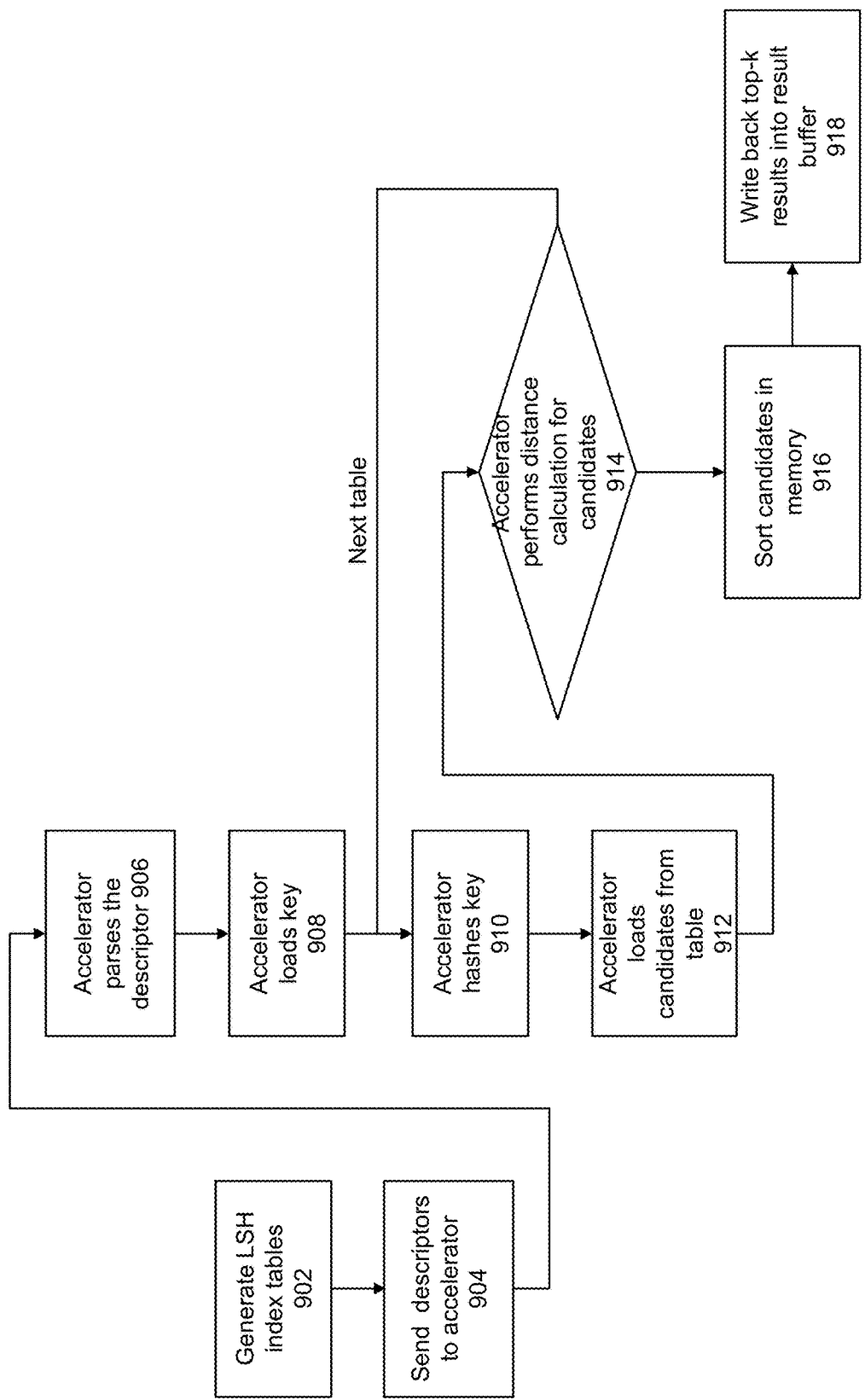
FIG. 9 depicts an example process to offload LSH operations to an offload accelerator engine.

FIG. 9 depicts an example process to offload LSH operations to an offload accelerator engine. At 902, one or more LSH index tables can be generated. For example, a CPU, GPU, IPU, DPU, or general purpose processor executing software can generate the one or more LSH index tables. LSH index tables can include the hash table associated with data to be processed. At 904, the processor executed software can send one or more descriptors to the accelerator to perform an LSH based on the LSH index tables. A descriptor can reference a key (e.g., image or other data) or batch of keys (multiple images) to perform an LSH operation.

At 906, the accelerator can parse the descriptor to identify a key or batch of keys. At 908, the accelerator can load the key and, at 910, the accelerator can hash the key to determine an index in the hash table to lookup a table. At 912, the accelerator can inspect the table identified by the index to retrieve a candidates list of one or more candidates. At 914, the accelerator can perform distance calculations using candidates relative to a query object in parallel using multiple instances of distance calculation circuitry. A query object can refer to a queried key. Operations 910-914 can repeat for index tables identified by the descriptor(s). At 916, the distances of candidates relative to the query object can be sorted according to resulting distance calculations. At 918, a top K number of candidates closest to the query object can be written to a result buffer in memory accessible to the process that requested the execution of the similarity search based on LSH.

Near-Memory Acceleration to Perform the Distance Calculation and Comparison on the Subset Similarity search including finding K nearest neighbors is a common workload. Memory bandwidth (e.g., rate of writing to memory or reading from memory) can be a constraint in completing workloads within an amount of time specified by a service level agreement (SLA). Queries can be processed in batches or groups.

Some examples provide a sorting architecture that sorts multiple queries in parallel. When the number of queries is less than the maximum number of queries provisioned in the architecture, it is possible to divide the sorting load among the unused hardware to offer higher sorting performance. A pipelined sorting architecture also can discard or prune values, and update a sorted list based on pruned values.

Some examples provide a near-memory processing of data to reduce memory bandwidth bottleneck and utilize technologies such as pruning in connection with batch query similarity search. Some examples perform distributed distance compute with multiple processing engines (PEs) where a PE includes compute circuitry and memory arrays. The compute circuitry can be reconfigurable for multiple distance compute modes and perform pruning. For a query in a batch, multiple PEs can work with a central sorting circuitry to keep a sorted list of K-nearest neighbors. Near memory processing can include a compute device positioned in a same die as a memory or on a different die than that of the memory device and coupled to the memory device using a device interface.

Distributed distance compute and communication with a shared sorting circuitry can improve performance of similarity search through parallelism. Pruning can improve performance by eliminating unnecessary distance compute operations.

Some examples include a near-memory distributed distance calculation system with a sorting architecture. Near-memory distributed distance calculation can reduce data movement and amount of data copying. A number of feature vectors (N) can be much larger than a number of queries (Q). Feature vectors can be stored in a high bandwidth memory such as last-level cache (LLC) or a scratchpad memory (e.g., non-cache memory for which software is responsible for writing or overwriting/evicting entries in the scratchpad memory). Instead of transferring N feature vectors out memory, some examples transmit Q queries to near-memory PEs and the PEs perform distance calculation local to a smaller group of subarrays storing a subset of N. For example, a final distance size can be 4B, which is much smaller than the feature vector size, which can be 32B-512B. Time to completion of processing and power cost associated with data movement can be reduced.

Near-memory processing unit can be built in a modular and memory agnostic manner, with no reliance on a particular memory technology. Near-memory processing unit can be coupled with volatile and/or non-volatile memory technologies. A datapath size can be changed to support the memory input/output (IO) size, e.g., 4B, 8B, 16B, or other sizes.

A near-memory processing engine (PE) can perform one or more distance compute modes, e.g., i) Euclidean; ii) Cosine similarity; iii) inner-product; iv) Manhattan; or v) Hamming. The datapath of distance calculations can share the same resources to support multiple modes.

Near-memory processing engine (PE) can perform pruning whereby a query can be skipped to a next feature vector if the distance between the query and feature vector has already exceeded a worst distance in an ordered list of distances at a given point in time.

Some examples use a hierarchical architecture combining multiple near-memory PEs and a central sorting circuitry. The distances calculated from individual PE travels towards the sorting circuitry, while the K-the neighbor distance for a query is provided to the PE and enables pruning at or near the PE.

Referring to the system of FIG. 8, distance calculation engine can include or be incorporated into near-memory compute (NMC) units described next. Memory can store an input candidate list from LSH and output is final nearest neighbors.

Figure 10:
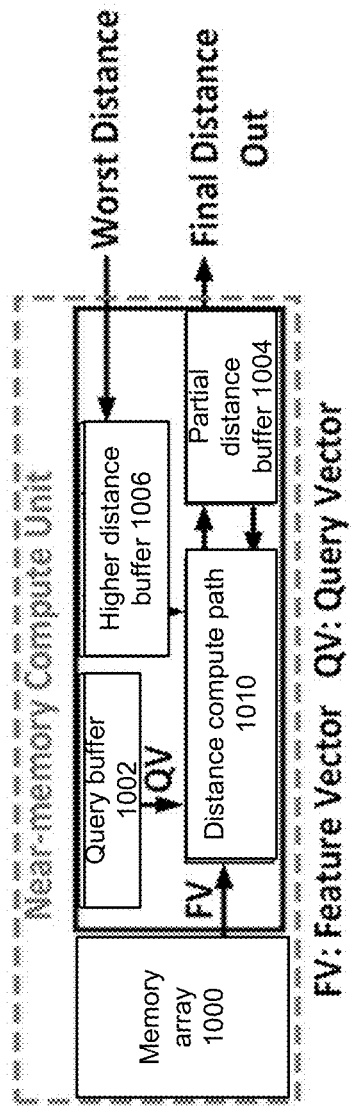
FIG. 10 illustrates the architecture of a near-memory distance computing unit.

FIG. 10 illustrates the architecture of a near-memory distance computing unit. A near-memory distance computing unit can include a memory array 1000 and distance computing datapath 1010. The datapath can compute on 'd' dimensions of the feature vector in a clock cycle and if the query and feature vectors are of size 'D' dimensions, then the distance between a query and a feature vector is completed in D/d clock cycles. The main memory buffers utilized in the datapath can include: i) query buffer 1002 to store a batch of B queries; ii) partial buffer 1004 to store the partial results of distance accumulation; and iii) higher distance buffer 1006 to store the worst case distance between a query and its neighbors.

Distance compute data path 1010 can determine a distance between a query vector (QV) from query buffer 1002 and feature vectors (FVs) from memory array 1000. In a near-memory compute unit, a word (e.g., 4B/8B) of a feature vector can be read from memory array 1000 and compared with a same word for multiple queries that are read from query buffer 1002. Higher distance buffer 1006 can store a highest distance between the QV and FVs for use to prune or skip to a next feature vector if the distance between the query and feature vector has already exceeded the highest recorded distance. Partial distance buffer 1004 can provide distances that do not exceed the worst distance to provide the top FV neighbors to the QV. Pruning can include comparing a partial distance value from FV to QV against the highest distance value and the if partial distance is worst (higher) than the highest distance, such QV can be excluded from further computation.

Figure 11:
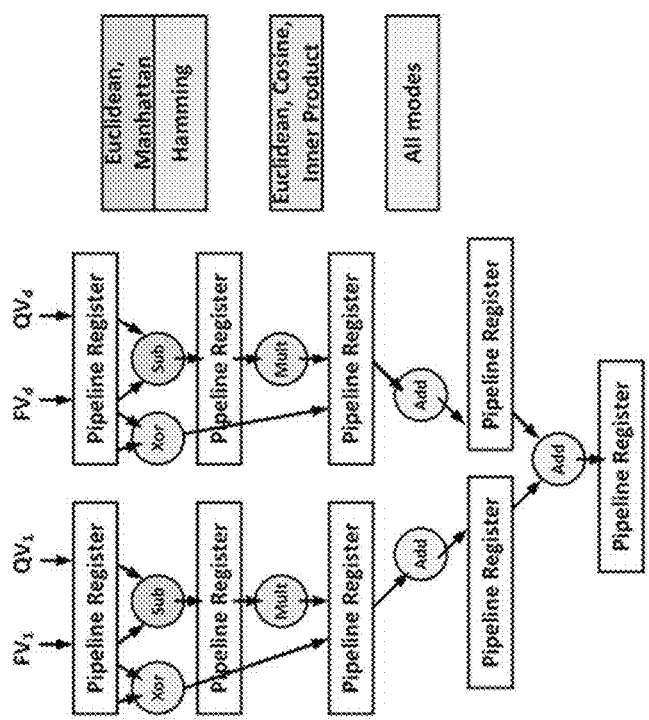
FIG. 11 illustrates the pipelined datapath which can be programmed to support multiple modes of distance calculation.

FIG. 11 illustrates the pipelined datapath which can be programmed to support multiple modes of distance calculation. Further, the datapath can support both 4b as well 8b per dimension, or other size. In some examples, d dimensions from both the feature vector and the query vector are inputs to the datapath. Dimensions can be handled separately at the beginning and eventually the results can be accumulated across multiple dimensions. A first stage can involve subtraction, which is used in Euclidean and Manhattan distance modes, or XOR, which is used in Hamming mode. A second stage can perform multiplication, which can be used in Euclidean, Cosine and Inner Product distance calculation. A pipelined adder tree can accumulate the distance across dimensions. The subtraction and multiplication units can be configured as 4b units which can either handle 4b operands or can be combined together to form 8b compute units.

Figure 12:
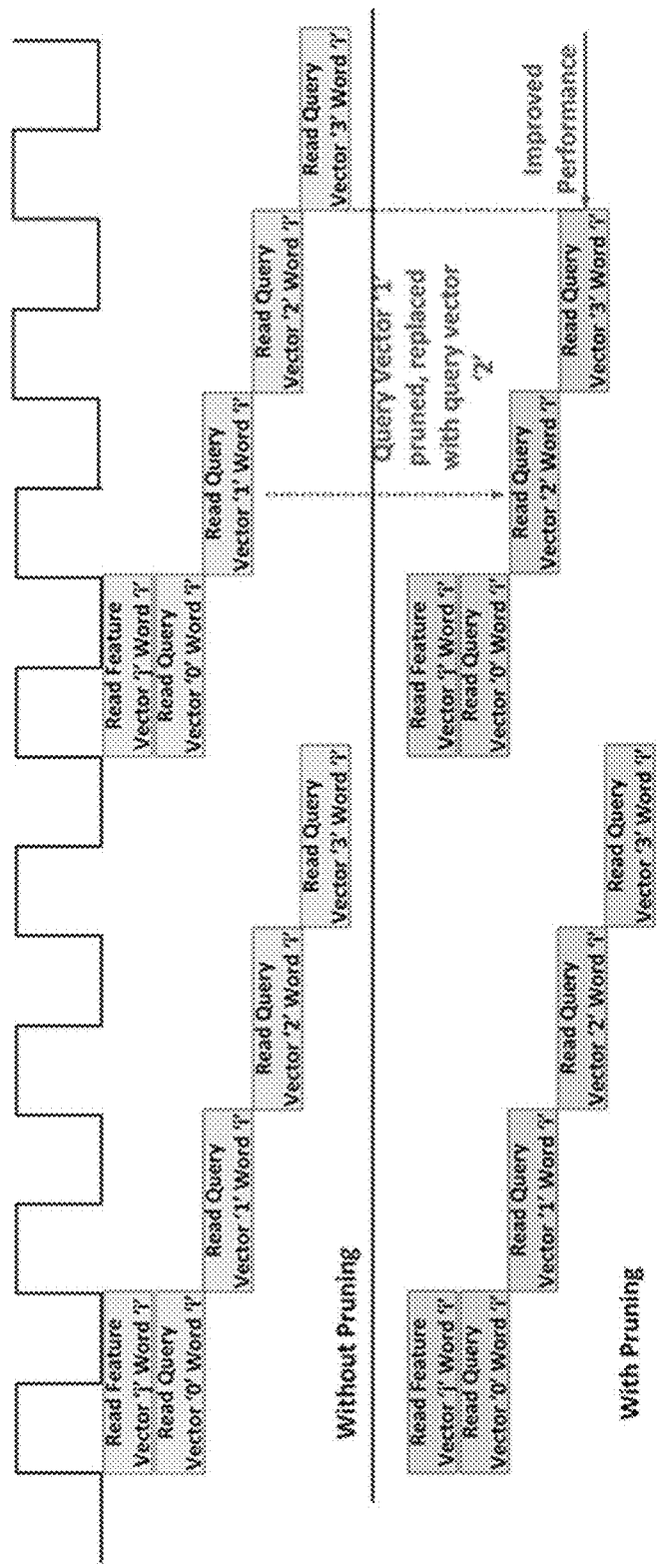
FIG. 12 shows an example of pipeline behavior of feature and query read with and without pruning.

FIG. 12 shows an example of pipeline behavior of feature and query read with and without pruning. Without pruning, feature and query vector reads can be deterministic. With pruning of a given query, the next query in a batch of queries is serviced in its place, thus reducing the overall time to service a batch of queries at a given near-memory compute (NMC) unit. If all queries in a batch are pruned away, the next feature vector is selected for comparison with a batch of queries.

Multiple NMC units can work in parallel to calculate a distance between queries and feature vectors in a distributed fashion. While a NMC unit works on the same batch of query vectors, due to pruning, each works on different feature vectors. Some NMC units can finish all distance calculation earlier than the other NMC units. Once the distance between a query and a feature vector is calculated, it is sent out from the NMC unit. These distances can be passed onto a sorting circuitry which is shared across multiple NMC units.

Figure 13:
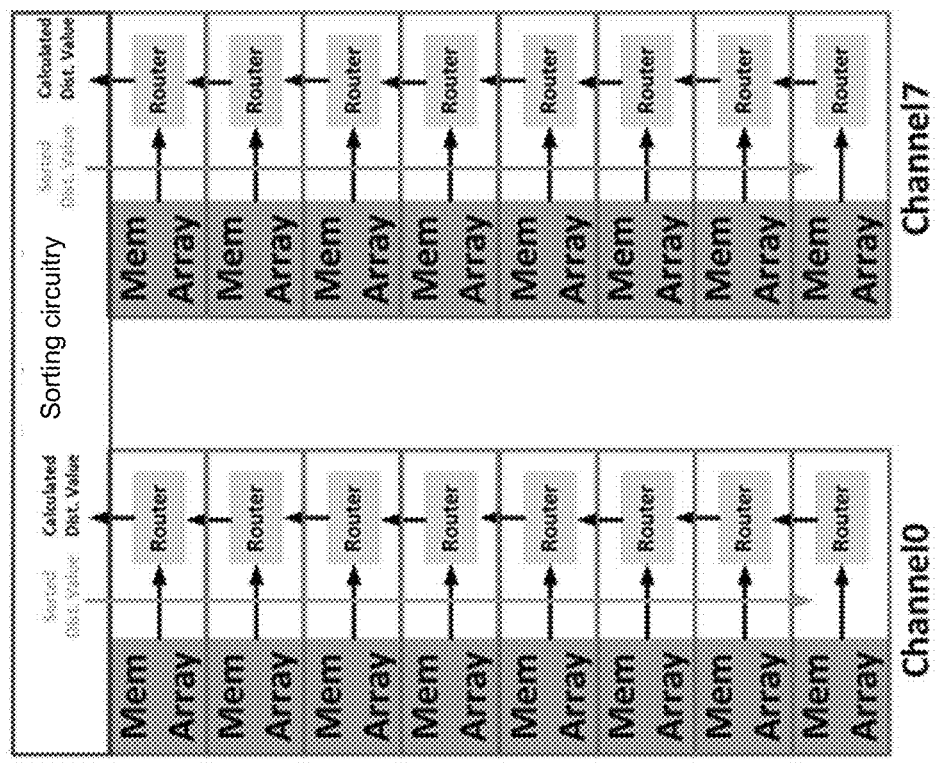
FIG. 13 shows an example organization of NMC units that share a single sorting circuitry.

FIG. 13 shows an example organization of NMC units that share a single sorting circuitry. A different organization is also possible. In some examples, a degree of sharing a sorting circuitry could depend on the length of the feature and query vectors. For smaller vectors, the distance calculation finishes early and hence the bandwidth that the sorting circuitry uses can be higher and therefore sharing could be lowered to meet a specific latency target. For longer vectors, finishing distance calculation can take more time, more NMCs can share a single sorting circuitry. A distance calculated between a query vector and a feature vector can be sent out from a NMC unit using a router with inputs (e.g., two inputs). One or more routers can transfer a calculated distance value to the sorting circuitry. A local port receives the distance from a local NMC unit and a south port receives distances that are forwarded from the NMC units below. A round robin priority scheme can be used to choose one of the two inputs.

After sorting, N distances can be maintained and provided as feedback to NMC unit (shown as arrow) and the N distances can be used for pruning at an NMC unit.

In this example, 8 NMC units are stacked on top of each other to form a channel. A final output from the NMC unit at the top of the channel is sent to the sorting circuitry. In some examples, 8 channels in parallel can use 64 NMC units. Highest measured distances can be sent from the sorting circuitry and broadcast to NMC units in parallel since the same queries are being used by the NMC units.

Figure 14:
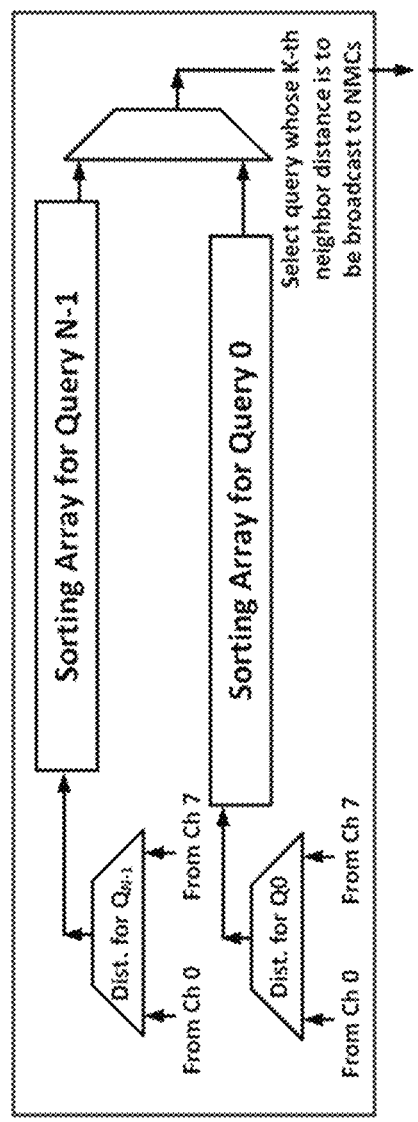
FIG. 14 depicts an example organization of the shared sorting circuitry.

FIG. 14 depicts an example organization of the shared sorting circuitry. The sorting circuitry can include parallel sorting arrays, where a sorting array can be used for a single query. As mentioned earlier, when the number of queries is smaller than what has been provisioned in hardware, a single query can have more than one sorted list, thus improving the sorting performance. Since one or more channels can bring in the distance for the same query, a round robin arbitration can be used to decide which channel is picked for that query. A same arbitration can be repeated for other queries as well. A sorting array can include memory to store up to 'K' nearest neighbor identifiers (IDs) and their distances from the respective query.

Entries stored in the memory can be maintained such that a sorted list (either ascending or descending) is stored. At a clock cycle, the K-th neighbor distance for one of the N queries can be broadcast to the NMCs. Picking one of the N queries can be performed by a round-robin arbiter. Hence, arbitration can occur at the input and at the output of the sorting circuitry.

Figure 15:
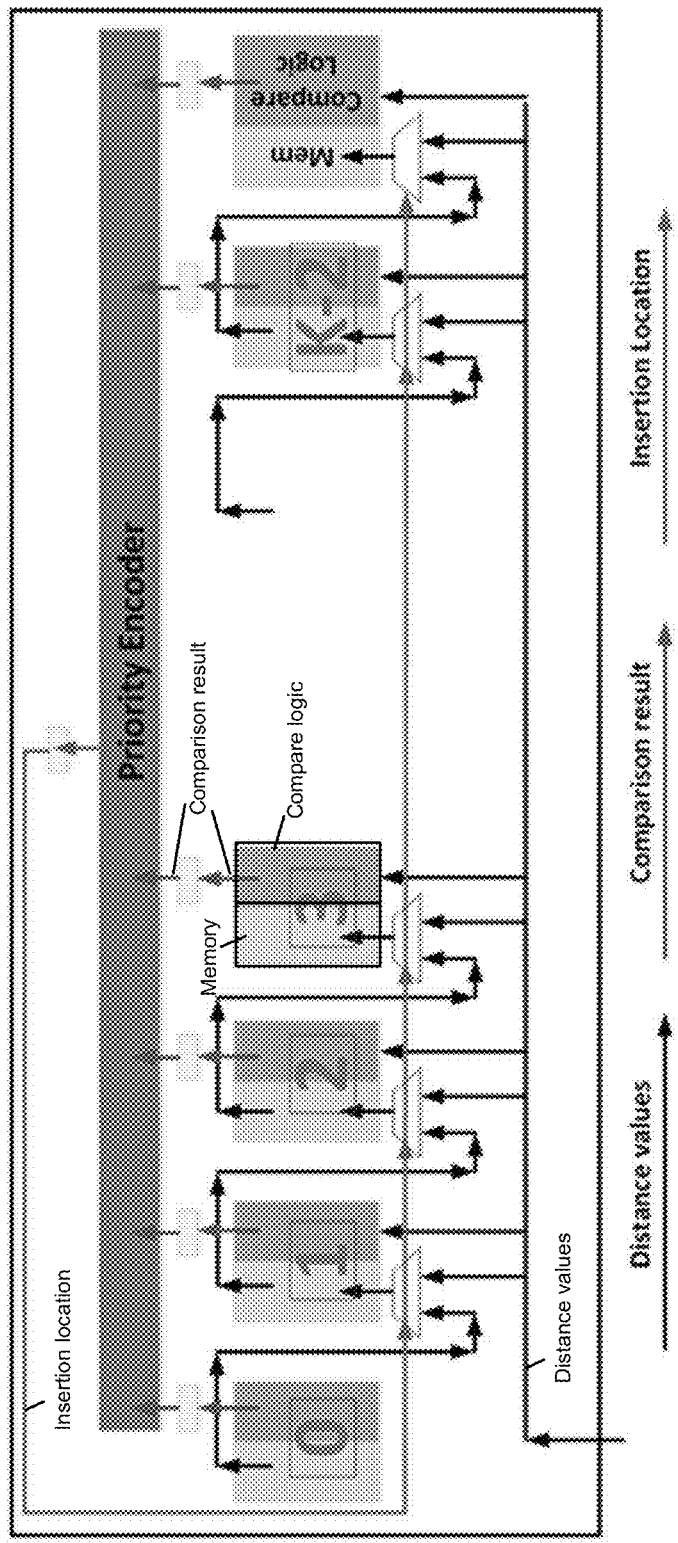
FIG. 15 illustrates an example organization of sorting array which stores the K-nearest neighbors for a single query.

FIG. 15 illustrates an example organization of sorting array which stores the K-nearest neighbors for a single query. This array can be instantiated 'Q'-times where Q is the query batch size. A first stage of the pipeline compares the incoming distance value with the distances that are stored in the sorted list that is stored in a memory. The memory can be implemented using discrete sequential circuits (e.g., flip-flops or latches) to allow parallel read outs and comparisons. If comparison with entries of the sorted list show that the incoming distance is more (or less depending on whether the list is ascending or descending), the distance can be discarded and the sorted list remains the same. In such a case, the sorted array becomes free to compare a new distance. When the parallel comparison shows one the entries is more or less than the incoming distance, that specific location is made free for insertion by shifting the entries down in the list.

A pipeline register can store an output (e.g., 1 or 0) from a compare logic 0 to K-2.

Acceleration for Data Transformation (DT)

With modern cloud providers and data centers, online services are usually deployed in loosely-coupled microservices, to achieve scalability flexibility and programmability. Remote Procedure Calls (RPCs) can be used to communicate messages between various microservices. A microservice may have its own programming language and data format. Data transformation (DT) can be used to convert data between various formats used by microservices. The conversion process can involve serialization to convert messages to a stream with a pre-defined format (protocol) to send or deserialization to convert the received stream to messages for applications to process. As an example, Protocol Buffers (Protobuf) is a language neutral, platform-neutral mechanism to serialize structured data into byte streams and deserialize byte streams back to structured data. For example, DT can be used in connection at least with Google protobuf, Thrift, Json, and others.

For example, for a remote procedure call (RPC), a compiler can translate data into serial form or deserialize the data. CPU cycles can be utilized to perform DT, such as for long messages and as message volume increases. Various examples provide a hardware accelerator to perform an offloaded DT operation.

A software generated transformation map can communicate a message structure with corresponding field size to the hardware accelerator for processing. An application programming interface (API) and instruction set architectures (ISAs) can be used to communicate the message and transformation map to the hardware. The hardware accelerator can perform DT processing requests in parallel.

Referring again to the system of FIG. 1A depicts an example system, compute engines of such system can be configured to perform DT based on a descriptor. A descriptor can include fields such as a pointer to the serialized string, address translation information, address for the output, address for the processing status, a pointer to a transformation map, and so forth. A transformation map can enable field level parallelism for serialization or deserialization. Load queue 120 can store addresses of inputs such as input serialized string, transformation map, schema, and other data. Compute engine 130 can perform data serialization or deserialization on input data based on the transformation map.

Figure 16:
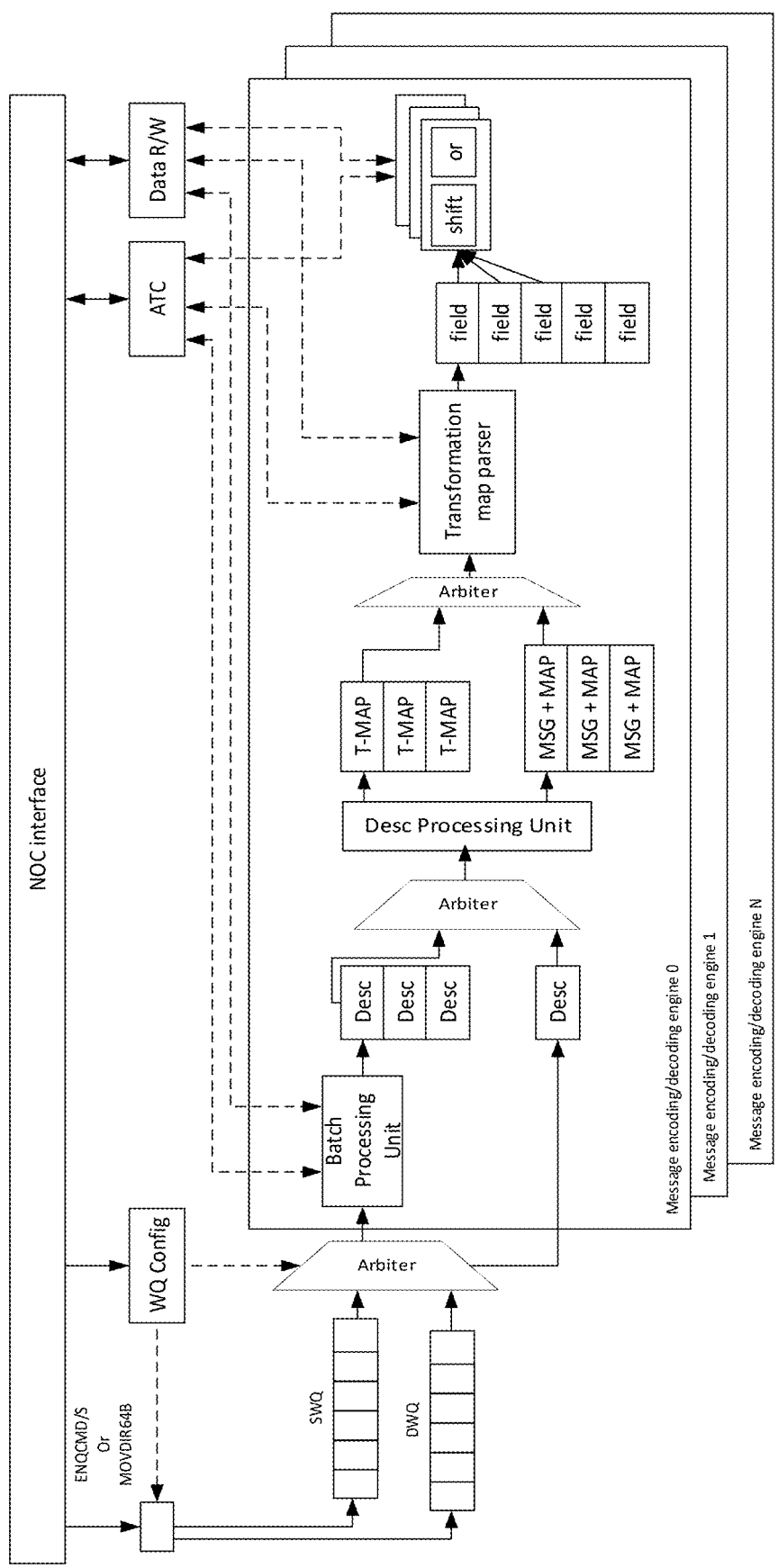
FIG. 16 depicts an example architecture for protobuf acceleration.

FIG. 16 depicts an example architecture for protobuf acceleration. Batch processing unit performs the operation of processing batch descriptors. Batch descriptors include information about a list of descriptors. Compute engine 130 can perform "bit shift" and logical "or" operations.

An example operation using the architecture of FIG. 16 is as follows. At (1), software creates one or more descriptors. At (2), software submits the one or more descriptors into shared work queue (SWQ) or dedicated work queue (DWQ). At (3), if the descriptor is a batch descriptor, then the Batch Processing Unit can process the batch descriptor to form a list of single descriptors. At (4), one or more descriptor processing units (Desc), in parallel, parse the descriptors, determine between serialization operation or deserialization operation, and adds a transformation map (T-MAP) to the queue for the serialization operation, or serialized input string (MSG) and map of message structure (MAP) to the queue for the deserialization operation. At (5), transformation map parser parses the map and separates the fields and adds the fields to the processing queues for the compute engines to either do serialization or de-serialization. At (6), the results written to the output buffer and the completion record is updated with the status.

FIG. 17 depicts an example of descriptor formats. The example descriptor formats are shown for serialization, de-serialization or batch descriptor processing.

Figure 18:
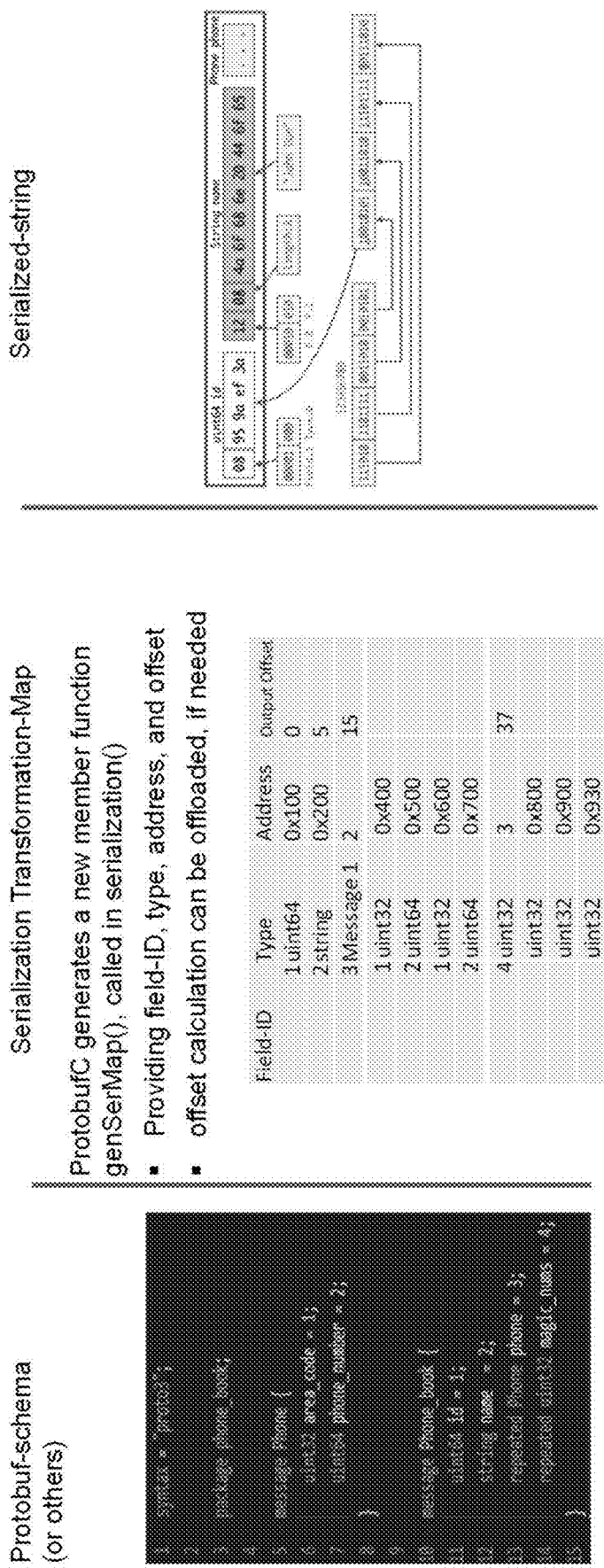
FIG. 18 depicts an example of serialization.

FIG. 18 depicts an example of serialization. For example, to transform a message from a first format to a second format, software can generate the transformation map with corresponding field, type, address per field and sub-objects. The accelerator can serialize the object (e.g., Protobuf-schema) to the corresponding field, type, address.

Schema can define the messages with fields and their corresponding types. A compiler can receive the scheme and generates code for a specific programming language (e.g., C++, Python, etc.) The accelerator receives a representation (Map) of message structure and the accelerator processing pipelines perform parallel processing across fields based on the Map. A Map can identify Field ID, type, memory address, and address offsets of fields. Field-ID can identify a field, input for the accelerator to create serialized string. Type can represent a data type, input for the accelerator to create serialized string. Address can represent a memory location where the value located. Output Offset can indicate a corresponding offset in the output buffer for this field.

Transformation map can configure the multiple compute engines in the accelerator to read the field and write the output for the field in parallel without any dependency among fields. The accelerator can perform parallel processing of fields based on the address offset of the fields and Map. A compute engine can use shifters to serialize the messages into byte streams and write back to the pre-allocated memory space for software to access. Examples of protobuf-schema are shown, but any type of schema can be used.

In serialization transformation map, Field 1 refers to message type uint 64. Field 2 refers to a message type string. Field 3 can refer to a repeat message type. Other field identifiers are shown. Address can refer to an address (e.g., virtual or physical) in system memory that stores data. Output offset can refer to results of serialization. Output results can be written in parallel to memory. Use of transformation map allows parallelization of processing of messages.

Figure 19:
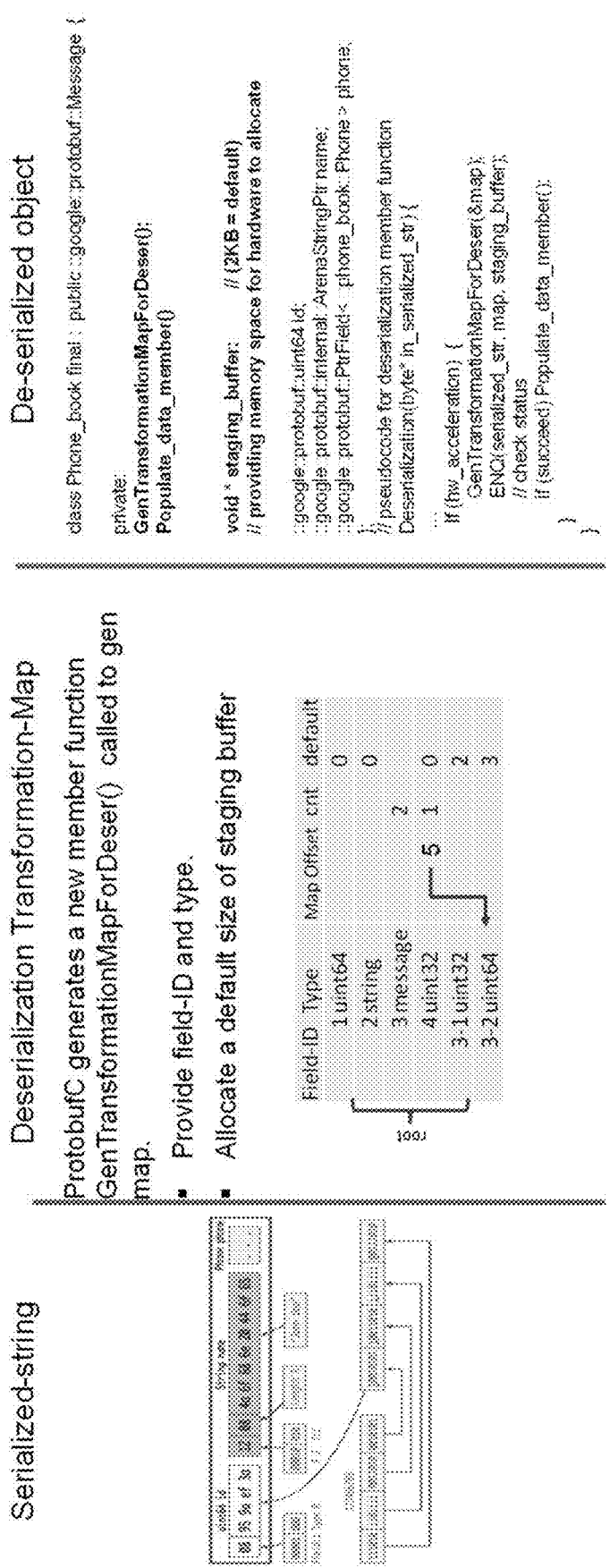
FIG. 19 depicts an example of deserialization.

FIG. 19 depicts an example of deserialization. Deserialization can transform received byte streams from to message objects that the software can process. A process that requests performance of the workload by the offload circuitry can provide a message schema in the form of a deserialization transformation map to indicate the structure of the message the byte stream represents. Based on the field ID and type, the accelerator device can allocate a staging buffer with a certain default size. The accelerator can process the received byte streams with pipelining that deserializes fields in parallel.

A deserialization transformation map can be used to transform a serialized string into a de-serialized object. The deserialization transformation map can include Field-ID, Type, Map offset, count (cnt), and default. Field-ID can represent an input for the accelerator to perform deserialization operation. Type can represent a data type for the accelerator to perform deserialization operation. For a nested data type, map offset and count (cnt) can be used to inputs for sub-fields. Default can represent a default value for the fields not presented in the serialized string.

Transformation map can allow the accelerator to lookup the first level (root) schema with the field-id directly. Transformation map can enable the multiple compute engines in the accelerator to read the field and write the output for the field in parallel without any dependency among fields. Root fields (1, 2, 3, and 4) are listed first, then for the field(s) who has the next level of (sub)fields (e.g., 3-1 and 3-2), sub-fields will be listed following the last root field. In the Map Offset column, the transformation map informs the deserialization engine that the field #3 has 2 sub-fields and they start from offset 5 (e.g., $5^{th}$ row). In other examples, a transformation map can sequentially list the fields with no offset indication. Other formats of transformation maps can be used.

A serialization or de-serialization transformation map can be provided per data transformation code generation. The transformation map can be specific to a message definition. The process that requests a serialization or de-serialization can submit a deserialization descriptor with the pointer to the transformation map, an input serialized string to be de-serialized to a message, other necessary information for the descriptor. The offload engine parses the descriptor and use the information (serialized string, transformation map, input, etc.) to deserialize the input and create a message.

Figure 20:
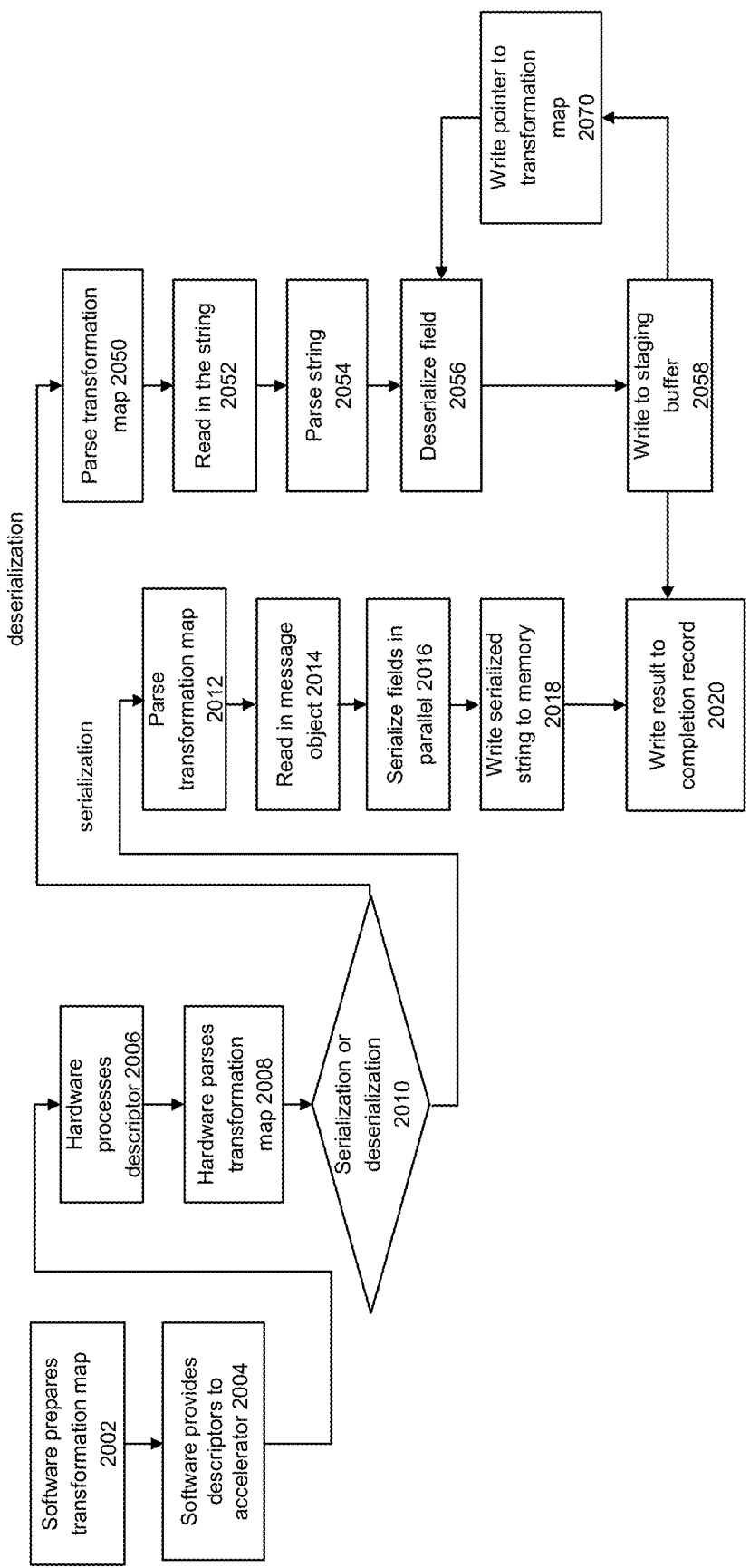
FIG. 20 depicts an example process.

FIG. 20 depicts an example process. The process can be performed to serialize or deserialize data by an offload engine. At 2002, a process executed by a processor prepares a transformation map. The process can be an addition to a data transformation language compiler (e.g., protobuf compiler). Software can iterate through fields in a message and generates a transformation map for either serialization or deserialization operations. A transformation map identifies the message structure, size of each fields, and the respective offsets in the output buffer for the engine to process. At 2004, software sends request (e.g., descriptor with pointer to the address and transformation map) to the accelerator engine.

At 2006, the accelerator engine (e.g., hardware) processes the descriptor and, at 2008, the transformation map. At 2010, based on the descriptor, the accelerator engine determines if a serialization or deserialization is to be performed.

For a serialization, 2012 can follow 2010, in which the accelerator engine can parse the transformation map. At 2014, the accelerator engine can read objects referenced by the descriptor. At 2016, based on the transformation map, the accelerator engine can process multiple fields in parallel and write the results into a staging buffer. At 2018, the accelerator engine can write the serialized string to memory. At 2020, when fields in a message are serialized (or deserialized), the final result is written into the output buffer at 2018, and a flag or status can be set in the complete record at 2020. An interrupt can be issued to notify the software that the DT for this message is complete. Optionally, the software can poll or mwait on the completion record, instead of being interrupted.

For a deserialization, 2050 can follow 2010. At 2050, the acceleration engine can parse the transformation map, read a string to be serialized (2252), and at 2054, parse the string of bytes based on the transformation map to generate a deserialized field at 2056. At 2058, the deserialized string of bytes can be written to the staging buffer. After completion of the deserialization of an input serialized string, the process can proceed to 2020. At 2070, a pointer in the transformation map can be written to indicate the offset of a deserialized field in the staging buffer.

Encode-Decode Acceleration of Message Based Control and Data Plane Networks

Remote procedure call (RPC) frameworks (e.g., Google rPC (gRPC)) enable a client application to directly call functions or services on a remote server application as if it was a local object. Distributed applications and services utilize RPC to communicate with one another. Protocol buffers (protobuf) are used to serialize structured data for program-to-program communication or for storing data. In some cases, a general purpose processor, such as a CPU, performs encode and decode operations for protobuf. However, a CPU performing encode and decode operations can prevent the CPU from other uses.

Some examples include offload of encoding of data for protobuf to a hardware accelerator. A CPU can post a descriptor to indicate a source memory address and length of a protobuf message. The accelerator can fetch the data and perform parallel encoding of a message. CPU resource cycles can be saved and power can be dedicated for other devices instead of performing encode/decode operations on the CPUs.

Figure 21:
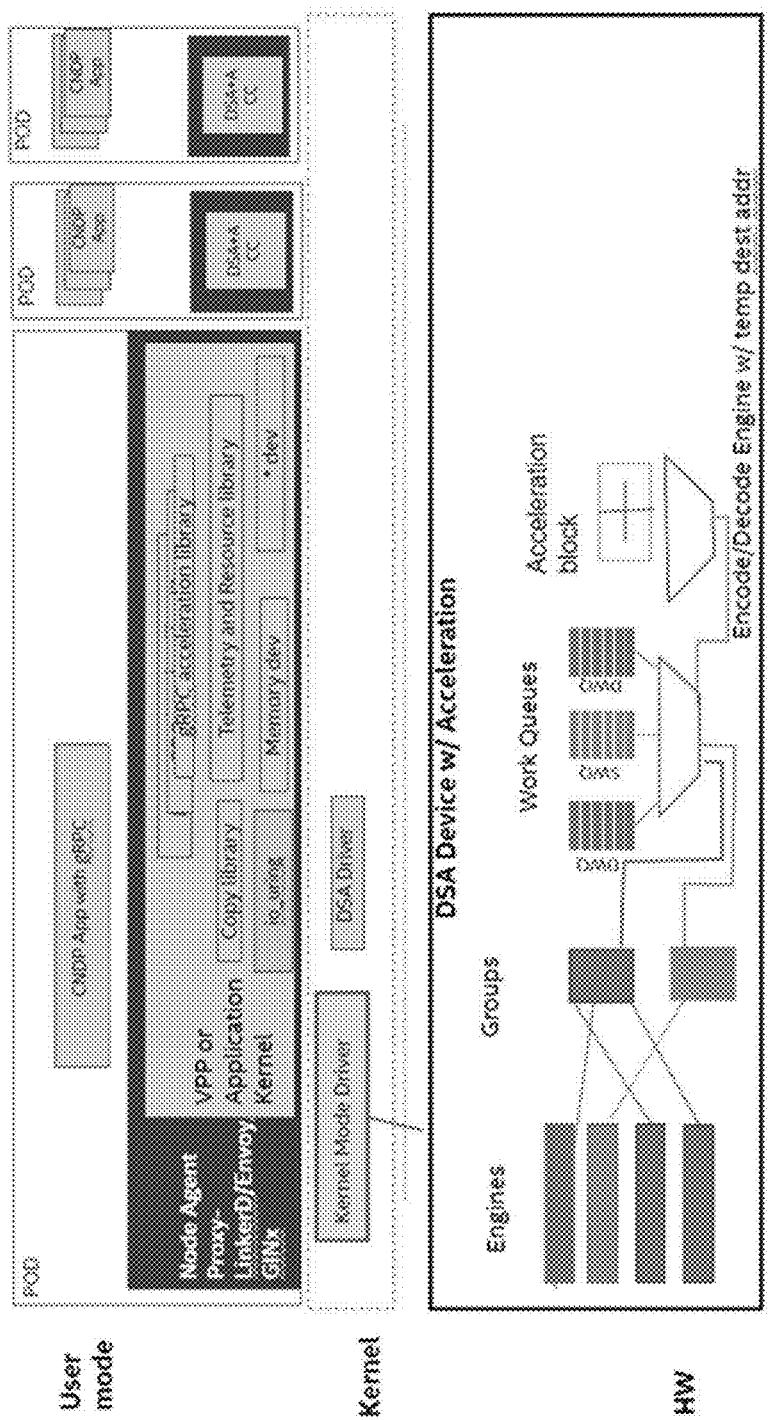
FIG. 21 depicts an example system.

FIG. 21 depicts an example system. Software executing on a CPU can utilize an API to provide a descriptor to the accelerator. The descriptor can include a pointer to an address of protobuf data that is to be encoded or decoded by the accelerator. The descriptor can include an address of a transformation map that specifies a mapping to configure the accelerator to parse or identify parts of the data such as data type, field number, and so forth. The descriptor can include a length field that specifies a length of data to be read, job type (e.g., encode or decode), and other fields.

Engines can represent state machines that configure operation of acceleration block. DWQ can represent dedicated work queues and SWQ can represent shared work queues. For a DWQ, a single client owns this exclusively and can submit work to it. For an SWQ, multiple clients can submit work to the SWQ. Acceleration block can perform either the serialization or deserialization operations based on work in a DWQ or SWQ.

Figure 22:
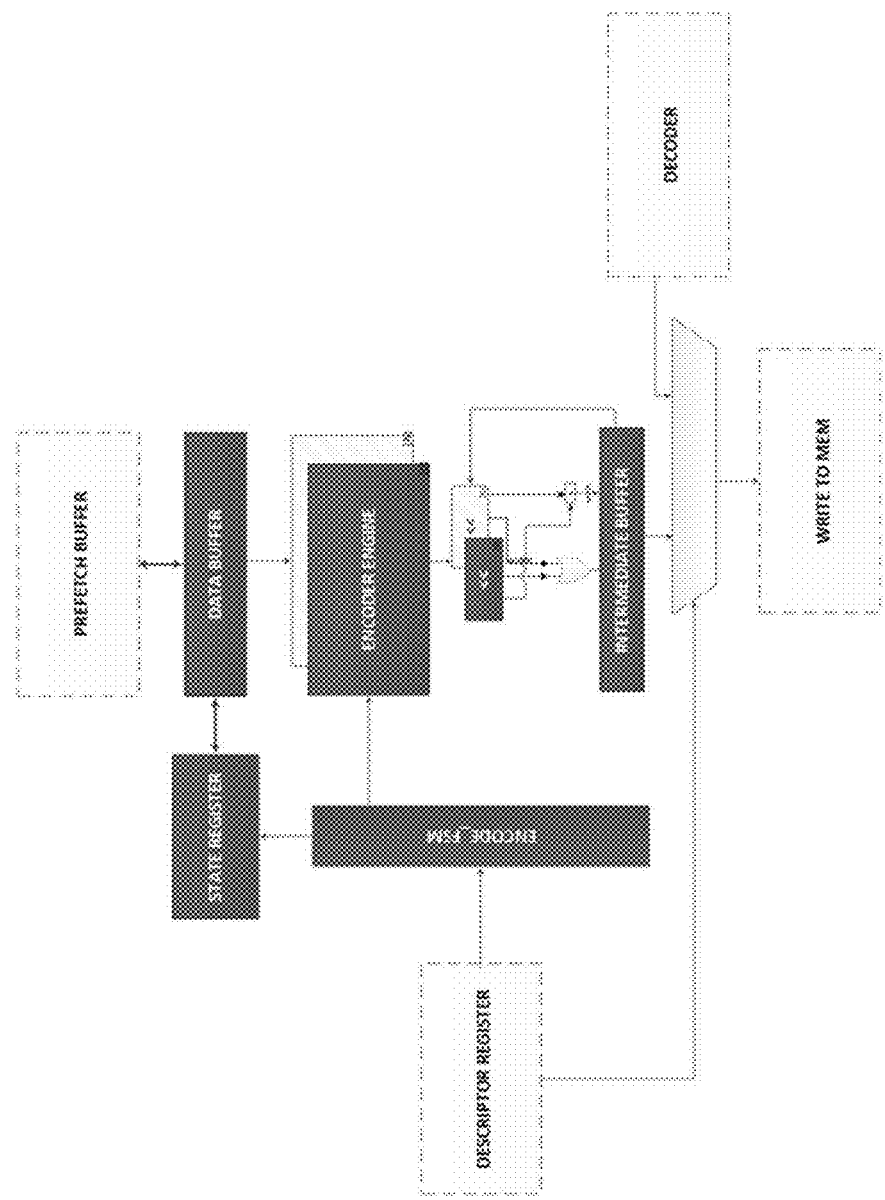
FIG. 22 depicts an example encoding system.

FIG. 22 depicts an example encoding system. When a protobuf message is to be encoded and serialized, a new job is submitted to the descriptor queue with a source address of the data, destination address of where processed data is to be written and other fields. For some data, data can be embedded in the descriptor itself. Work Descriptor Unit (WDU) engine (e.g., encoder engine) can encode or decode the data. Prefetch Buffer can fetch data from the memory based on the destination address and configure the WDU to perform the encode job. For an encode operation, depending on the protobuf message, WDU can be configured to encode the message. State registers can store the transformation map to configure the encoder engine to perform encoding. WDU can assert a busy signal until a job is done. For messages within a particular size range, the message, instead of the descriptor can identify, to the WDU, the data type and the size of the message at a beginning of the message.

Multiple encoder engines can encode portions of data in parallel. A number of encoder engines used can depend on a size of the data so that longer data can utilize more encoder engines to decode data. Shifters can align encoded data output from the encoder engine. Also, if the intermediate buffer indicates an insufficient amount of data, data can be recycled through the shifters.

Figure 23A:
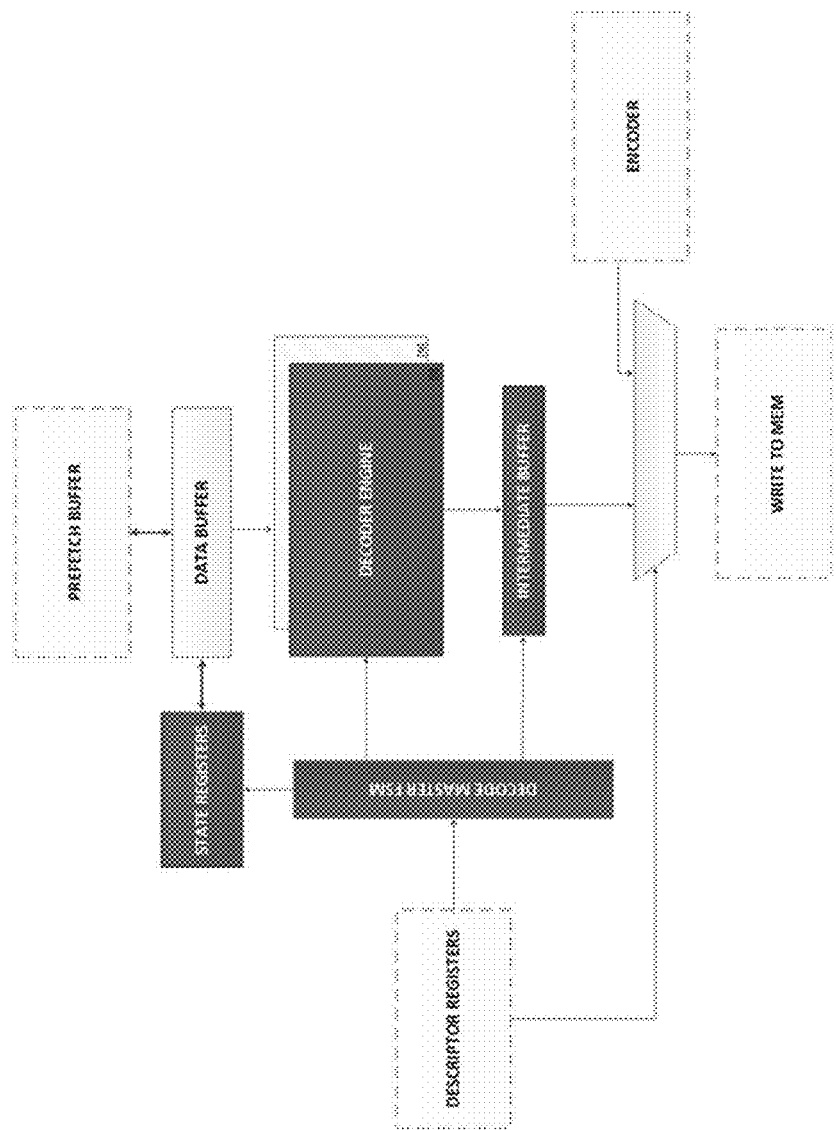
FIG. 23A depicts an example decoding system.

FIG. 23A depicts an example decoding system. A data buffer can handshake between prefetch buffer and receive new data. State registers can store the transformation map that configures decoder engines to perform data decoding. Multiple decoder engines can perform decoding in parallel. A number of decoder engines used can depend on a size of the data so that longer data can utilize more decoder engines to decode data. Intermediate buffers can capture data from the decode engines and send to the write to mem circuitry to write to a destination buffer in memory.

Figure 23B:
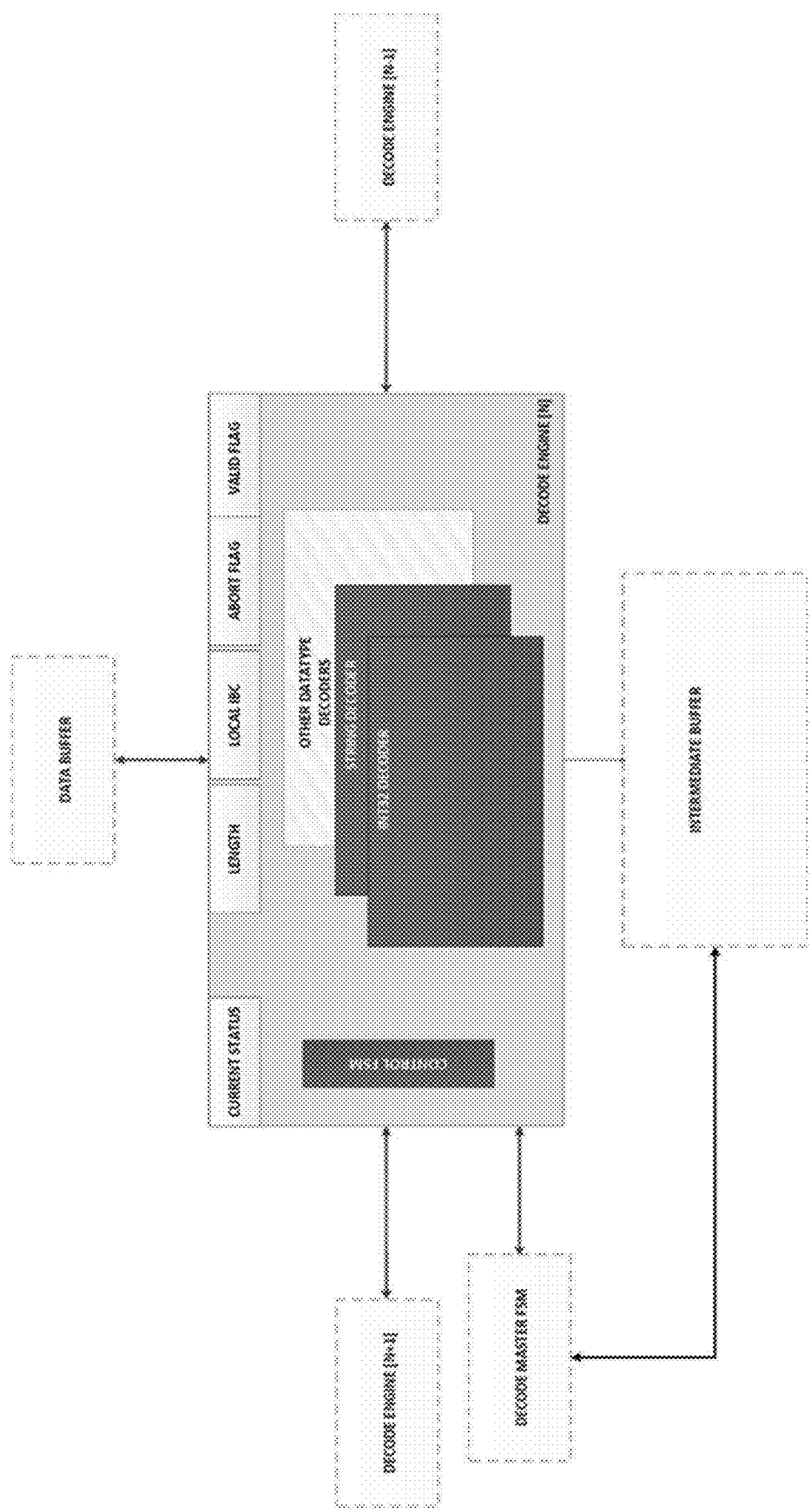
FIG. 23B depicts an example decoding system.

FIG. 23B depicts an example decoding system. A first stage in the decoder acceleration can perform handshaking between prefetch buffer and receiving new data. State Registers can store the transformation map. At the end of the job, State Register information can be written out. In a second stage, the decode engine can perform a decoding operation. There can be N parallel engines configured to perform decoding operations. For parallel operations, the input data stream can be split into multiple data streams for processing by multiple engines. In a third stage, the intermediate buffers can capture data from the decode engines and send the data to the write_to_mem module.

Hardware Acceleration for Recommendation Based Systems

Personalized recommendation is a fundamental building block of many internet services used by search engines, social networks, online retail, content streaming, and others. Recommendation engines identify a likelihood that the user will be interested in a selection based on the user's history, history of similar users and characteristics of the choices, and other factors. Recommendation engines can utilize a deep neural network (e.g., top fully connected and bottom fully connected layers) to filter selections and identify whether selections are of interest to a user, and embeddings or embedding tables that hold mathematical representations of selections and their characteristics and user related preference information. For large numbers of choices or selections and their characteristics, embeddings can utilize a large amount of memory both in terms of capacity and bandwidth.

In some cases, performance of a recommendation system is bounded by limits on memory accesses, even for sparse data (e.g., data with interspersed zero values) embedding lookup operations with irregular memory access patterns. Embedding lookup operations with high model, operator and data-level parallelism can lead to memory bandwidth saturation, limiting recommendation inference performance.

A general purpose processor can execute software to generate a transformation map to communicate message structure to the accelerator for processing. An application program interface (API) and instruction set architectures (ISAs) can be used to communicate a message and transformation map to the accelerator. Some examples offload embedding lookup operations from a general purpose core to an accelerator. Some examples provide a near memory accelerator to accelerate embedding lookup operations, such as for sparse data models. Some examples provide interfaces and extensions that configure a near memory compute device to a relevant tier in a memory hierarchy (e.g., in the core, on die caches, in memory, or in memory pool) to reduce data movement operations. Embedding lookup operations can be computed at a level of the memory hierarchy where the data is stored. Some examples distribute a workload across multiple instances of the near memory compute. Some examples perform scheduling requests using heuristics. Embedding lookup operations can be used at least for recommendation systems, Deep Learning, or artificial intelligence (AI).

Embeddings can be organized in the form of multiple tables. An inference can lookup multiple values in multiple tables and combine them. Embeddings can be stored in a number of different datatypes ranging from floating point 32 (FP32), FP16, Bfloat 16, INT8, INT4, or other formats. For lower precisions such as INT8 or INT4, a conversion to a different numerical format can be performed.

Figure 24:
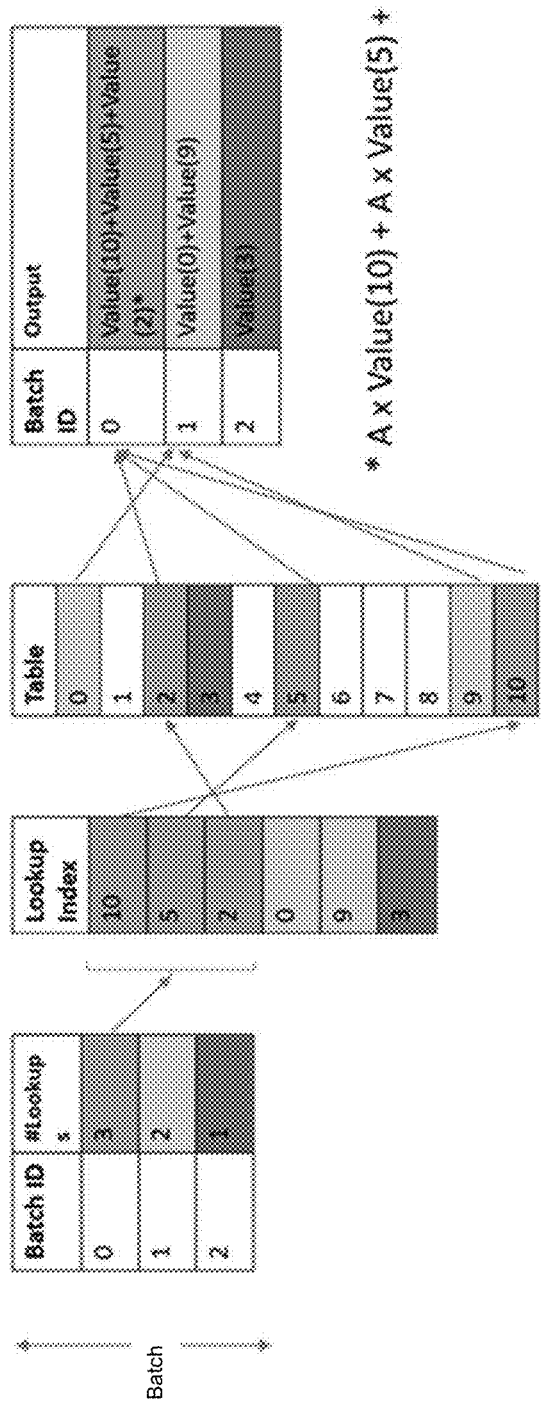
FIG. 24 depicts an example of multiple lookups into a single table.

FIG. 24 depicts an example of multiple lookups into a single table. For example, SparseLengthsSum (SLS) is described at least in "The Architectural Implications of Facebook's DNN-based Personalized Recommendation," Udit Gupta, Carole-Jean Wu, Xiaodong Wang, Maxim Naumov, Brandon Reagen et al. A computation performed on embedding lookups can be a simple addition or a scaled multiplication followed by an addition.

In this example, Batch ID=0 has 3 lookup operations, Batch ID=1 has 2 lookup operations, Batch ID=2 has 1 lookup operation. Lookup operations can take place into a Lookup index to identify an index into a Table. The first three lookup operations for Batch ID=0 can be of the first three entries in Lookup index table, the next two operations for Batch ID=1 can be of the next two entries in Lookup index table, and the next operation for Batch ID=2 can be of the next entry in Lookup index table. Entries in the Table can be identified by entries in Lookup index table. Based on the values retrieved from the Table, an output can be calculated. In this example, entries 10, 5, and 2 from the Table are added together; entries 0 and 9 from the Table are added together; and entry 3 from the Table is output. Other operations can be performed such as data type conversion whereby data is stored with a scaling and offset factor to scale data from one data format to another or addition after multiplying with a scalar.

Referring back to the system of FIG. 1A, a process can utilize offload engine to perform embedding lookup. A process can run on processor 100 and the process can utilize a neural network with embedding lookup. The process can bundle one or more embedding lookups and send the bundle to the accelerator device. The request can be stored in the request buffer accessible to offload engine 110. A request could be associated with a batch of sub-requests associated with multiple descriptors to be processed. A descriptor can reference work to be performed by offload engine 110. For example, multiple compute engines 130 can perform embedding lookups in parallel.

A descriptor entry in the context table can cause the accelerator to read data from memory to the load queue. A descriptor entry can include a request identifier (RequestID) and list of memory addresses. The memory addresses can refer to multiple rows to be looked up in the embedding table. A TLB can be accessed to lookup physical addresses of data to be read from memory. In some examples, memory can be a tier of memory such as cache (e.g., level 1 (L1), level 2 (L2), and/or last level cache (LLC)), volatile memory, High Bandwidth Memory (HBM), persistent memory, storage, or memory pool. After a data read, compute engines 130 can perform multiply add carry (MAC) operations and write results to an output buffer using write queue 122. Compute engines 130 can indicate to process 100 a memory address region in memory or cache in which result data is stored after a descriptor is processed.

Compute engines 130 can include an array of Fused multiply-add circuitries (FMAs) that perform a floating-point multiplication and addition, with optional scaling. Compute engine 130 can perform multiply-accumulate (MAC) that computes the product of two numbers and adds that product to an accumulator.

Figure 25:
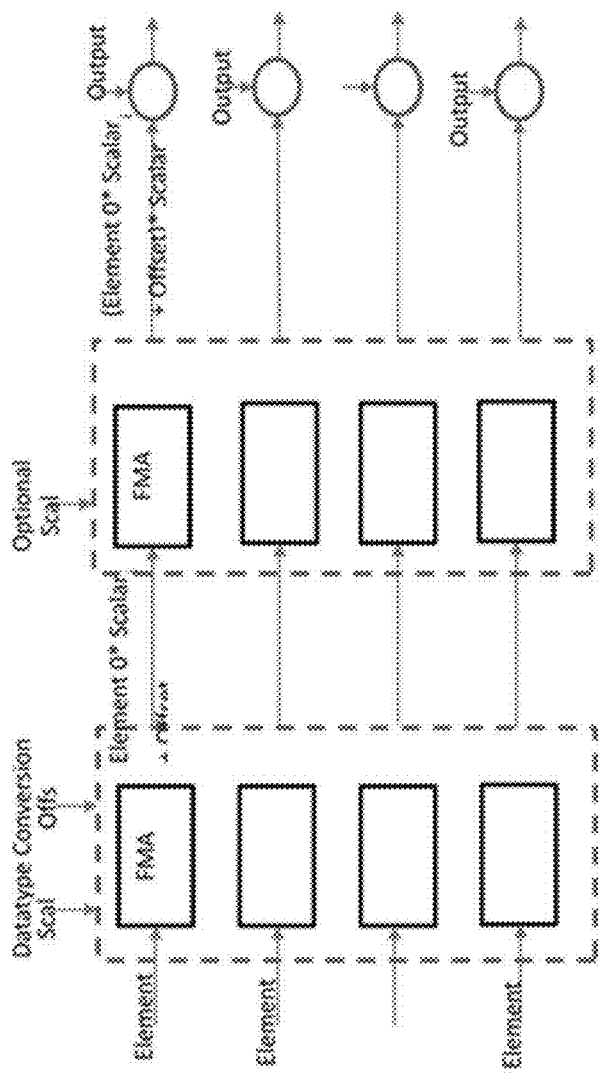
FIG. 25 depicts an example of a compute engine with FMAs and adders to perform a single embedding lookup.

FIG. 25 depicts an example of a compute engine with FMAs and adders to perform a single embedding lookup. The output data can be held in buffer and input embedding data can be read. Scaling can be performed on output data in some examples.

Hardware Offload Engine for Sparse General Matrix-Matrix Multiplication (Spgemm) using Hash Accumulation Sparse general matrix-matrix multiplication (SpGEMM) is a procedure used in computing applications such as algebraic multigrid solvers, triangle counting, multi-source breadth-first searching, and so forth. Performance of SpGEMM can be a bottleneck because the amount of compute and memory resources to compute a sparse matrix C such that C=A×B, where A and B are sparse input matrices. A sparse matrix, A, by definition has a number of nonzero (nnz(A)) elements when compared to the total dimension (number of rows or columns) of A. As a result, only non-zero elements of A are stored in memory and its location in the matrix. For example, a format to store sparse matrices is compressed sparse column (CSC) and Compressed Sparse Row (CSR) format.

Parallel SpGEMM calculations can use multiple threads to speed up the matrix multiplication operation and use a variant of the traditional Gustayson's procedure (e.g., F. G. Gustayson, "Two fast algorithms for sparse matrices: Multiplication and permuted transposition," ACM TOMS, vol. 4, no. 3, pp. 250-269, 1978). Gustayson's row-wise SpGEMM is a manner of accelerating SpGEMM where the SpGEMM output matrix is constructed by accumulating partial sums from a multiplication of subset of rows and columns of the input matrices. Data structures can be used for the accumulation (also called merging) technique, including heap, hash tables, and sparse accumulator (SPA).

A variant of Gustayson's operation can be used for SpGEMM, so multiple threads can run in parallel to compute the rows of the output matrix (C). Firstly, a unit-stride streaming access pattern arises from access of the row pointers of A as well as the creation of the sparse output vector ci*. Secondly, access to rows of B can occur where small blocks of consecutive elements are fetched from effectively random locations in memory. Updates to the accumulator exhibit different access pattern depending on the type of the accumulator (e.g., a hash-table, SPA, or heap).

A hash-based accumulator (also called hash-based sparse accumulator) can be used to accelerate Gustayson's operation. A hash table can be assigned for a thread to compute one or more rows of C. A hash table size can be based on an upper bound estimation depending on the maximum number of non zeros in A and B in a certain low. A key to the hash table uses the column indexes of the intermediate results. Then the hash table is shrunk to a dense state after hash functions. Sorting the values of the rows of the result matrix according to their column indexes can occur to obtain a final result matrix compressed with sparse format. Hash-based accumulation is used in many software applications, for example it is used in NVIDIA cuSPARSE sparse matrix multiplication function.

The number of hash tables used for hash-based accumulation can equal a number of threads and the operation can involve reading hash table indices, sorting based on column indices and writing the accumulated result. Hence, memory loads, in random memory locations, can occur because column indices (corresponding to nonzero locations) are random and are brought to the CPU cache for accumulating the results. Loading the different values from the hash buckets to perform the partial multiplication can occur. When hash-based accumulation is used, a large number of hash tables are to be accessed (e.g., table reads and writes) by different threads. This random memory access and large number of tables can lead to memory resource bottleneck from accessing many hash tables due to latency and bandwidth constraints, which introduces latency in performing SpGEMM operations.

Figure 26:
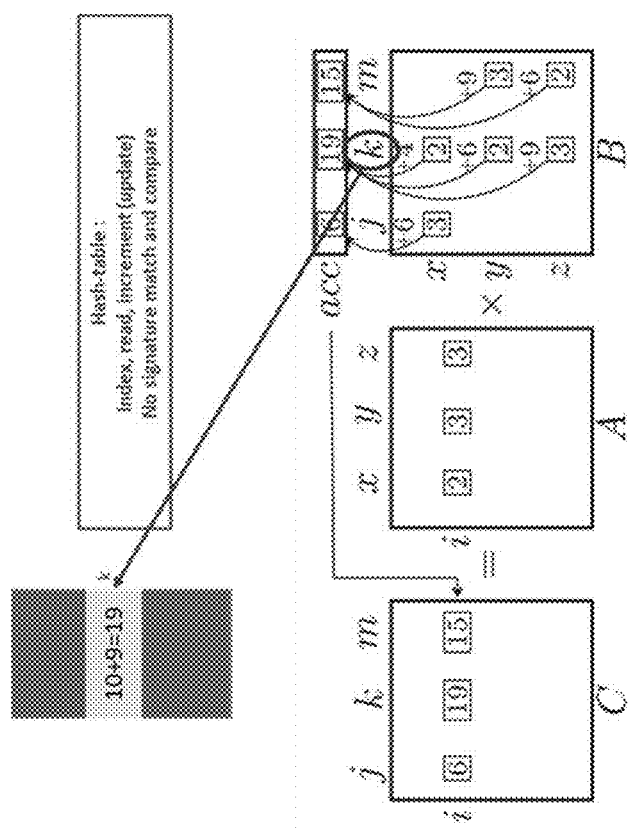
FIG. 26 depicts an example of performing matrix multiplication.

FIG. 26 depicts an example of generating C=A*B. When the Gustayson algorithm is used to obtain C, a partial multiplication is performed for items in A and B, and partial multiplication results are merged (summed) to get a value of one item in matrix C. A value in C is the result of multiplying the nonzero items in a row of A, with nonzero items in a column of B.

A result in C is partially accumulated with each new row of both A and B. The hash table is looked up with the column index of B, to read the partial accumulated value and then adds to it the multiplication value and the new partial multiplication value is updated, and this goes on until all rows of A and B are finished at that time final values of C is known.

Row i of Matrix A has value (2, 3, 3) at locations $<i,x>$, $<i,y>$ and $<i,z>$ and the rest of row $<i>$ are zeros. Row (x) of Matrix B has values $<3, 2>$ at locations $<x,j>$ and $<x,k>$. Row (y) of Matrix B has values $<2, 3>$ at locations $<y,k>$ and $<y,m>$, with the remaining values being zero. Row (z) of Matrix B has values $<3, 2>$ at locations $<z,k>$ and $<z,m>$, with the remaining values being zero.

A thread can be assigned to compute multiplication of row $<i>$ in A to generate row $<i>$ in C. Gustayson algorithm for SpGEMM is row-wise, so B is also read row by row. A compressed format (e.g., CSR) can be used to store both matrices, A and B. Matrix B can be read in rows and not in columns. Rows of both A and B are read and a hash table is used to accumulate the partial results until all rows of both A and B are processed to provide the final value of C.

Reading row y of B, at item=2 which is located at $<y,k>$, the column index (k) is used to perform a lookup in the hash table to read the partial accumulated data already there. The value 4 is stored (4 was inserted from an earlier multiplication of 2*2 from processing row X of B). Multiplication of row value of A with the Kth element in the row Y can occur (3*2=6) and 6 is accumulate with 4 to arrive at 10, which is written in the hash table at location with index K. The same process repeats when it is time to process row Z, where the partial accumulated result at K (read 10) is accumulated with 9 (3*3) for the final value of 19 in item $<i,k>$ in C.

Column index (e.g., j, k, m) can be used as indices to a hash table to read the already accumulated values so far to do the summation. A thread finishes its assigned rows. When threads are finished, the resulting values can be the final values. The hash-table accumulation can be used to store these partial results. The operation includes reading the value accumulated so far (read op) from the hash table, multiplying a row item of A with column item of B (multiply op), then incrementing the accumulated sum (add op) with the multiplication value (write op) and so on.

Some examples offload to a hardware accelerator hash table access operations and table reads and writes needed for partial results accumulation. A hardware accelerator can access a series of hash tables, walk the hash tables to determine a partial result, perform the multiplication and accumulation on matrices, and provide a resulting output matrix to an application thread. The hardware accelerator can be positioned near memory to avoid cache thrashing and perform accumulation near the data.

Figure 27:
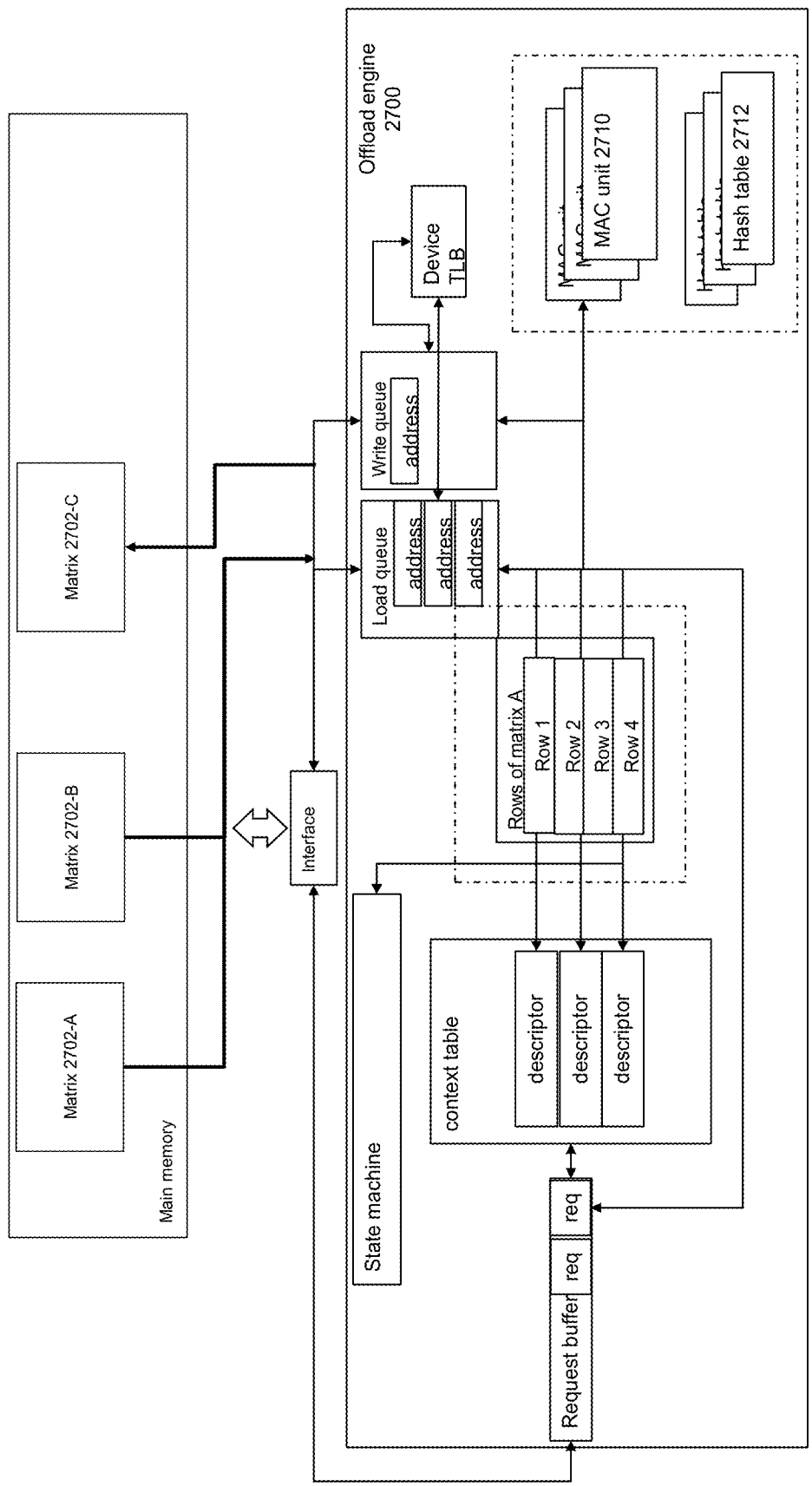
FIG. 27 depicts an example system.

FIG. 27 depicts an example system. The offloading engine can perform: 1) hash table lookup to determine a partial accumulated sum so far for a specific column index, 2) multiply-accumulate (MAC) operations using one or more MAC units 2710 in parallel on sparse matrices, and potentially, 3) conversion of hash table 2712 result to Compressed Sparse Row (CSR) format. In some examples, conversion of hash table result to CSR format can be performed by a CPU or another hardware circuitry. Hash table 2712 can be stored in memory and can store the final values of C after the multiplication loops are finished. As C is a sparse matrix, it can be compressed in any format (e.g., CSR) and then stored in memory so that if the CPU loads C later, it loads the compressed data.

For an operation of A×B=C, a descriptor can include one or more of: (1) metadata address of Matrix A (to read content of matrix 2702-A from main memory); (2) metadata address of Matrix B (to read content of matrix 2702-B from main memory); (3) address of hash table array (a hash table can store results of one row of matrix 2702-C); (4) start row ID of matrix A to be processed; (5) end row ID of matrix A to be processed; and/or (6) metadata address of matrix C. A descriptor can include multiple rows from start to end for processing. Multiple MAC units can process a range of rows in parallel. For example, MAC unit 0 can process rows 0-99, MAC unit 1 can process rows 100-199, and so forth. Metadata of a matrix can include information about the matrix for the accelerator to read the matrix from main memory, such as one or more of: (a) row and column size of the matrix and/or (b) starting address of the Value, Col_idx, and Row_idx arrays (e.g., CSR format with 3 arrays to describe a matrix).

Request buffer can store requests provided by a descriptor. A request can be in a format that the core sends over with a cache line. When the descriptor representing a request reaches the accelerator, it is placed in the request buffer. Offload engine 2700 can parse the requests and put them in the context table in the format that offload engine 2700 can process. Descriptors can be processed in parallel by offload engine 2700.

The accelerator can parse the descriptor and caches the rows identified by the descriptor into a buffer. For A×B=C, a descriptor could include one or more of the following fields: (1) metadata address of Matrix A (to read content of A), (2) metadata address of Matrix B (to read content of Matrix B), (3) address of hash table array as a hash table contains the results of one row of Matrix C, (4) start row ID of Matrix A for processing, and/or (5) end row ID of matrix A for processing. A descriptor can identify multiple rows from start to end for processing. Hash table look up and hash table walking can be performed from hash table 2712.

For a row of A, the accelerator can read non-zero items from the row and its index. For each item, the accelerator iterates the corresponding row from matrix B. The accelerator multiplies items from A and the items from the corresponding row of B. The accelerator can read the intermediate results from the hash table and outputs the accumulated results back to hash table.

MAC unit 2710 can perform multiplication of a row from matrix A by rows of Matrix B to generate a row of matrix C. There may be multiple accelerators, and an accelerator processes a range of rows (e.g., accelerator 1 process row 0-99, and accelerator 2 processes row 100-199). The metadata of a matrix could include the information about the matrix for the accelerator to determine how to read the matrix from main memory such as row and column size of the matrix and starting address (e.g., Value, column index (Col_idx), and row index (Row_idx) arrays. With sparse matrices, all matrices are stored in compressed row format. Hence, MAC unit 2710 can compute row-wise multiplications by 2 loops an outer loop for the rows of A and an inner loop for the rows of B.

An application can create a hash table for each output row, and the accelerator can perform lookup of the hash table to read the partial accumulated multiplication for this column and add (accumulate) the result of the current MAC for the corresponding entries. For example, for a Matrix A row 1 of values 1234 and Matrix B with row values of 1101, 2101, 3101, and 4010, the first row of Matrix B can be read, multiplication of 1 of Matrix A by 1101 and accumulate, multiplication of 2 of Matrix A by 2101 and accumulate, multiplication of 3 of Matrix A by 3101 multiplication of 1 of Matrix A by 1101, and multiplication of 4 of Matrix A by 4101 and accumulate earlier multiplications. The procedure continues for the subsequent rows of matrix A and so forth to provide an intermediate result.

Optionally, if the accelerator post-processes the hash table results back to CSR format of C, the descriptor could also the metadata address of matrix C.

Figure 28:
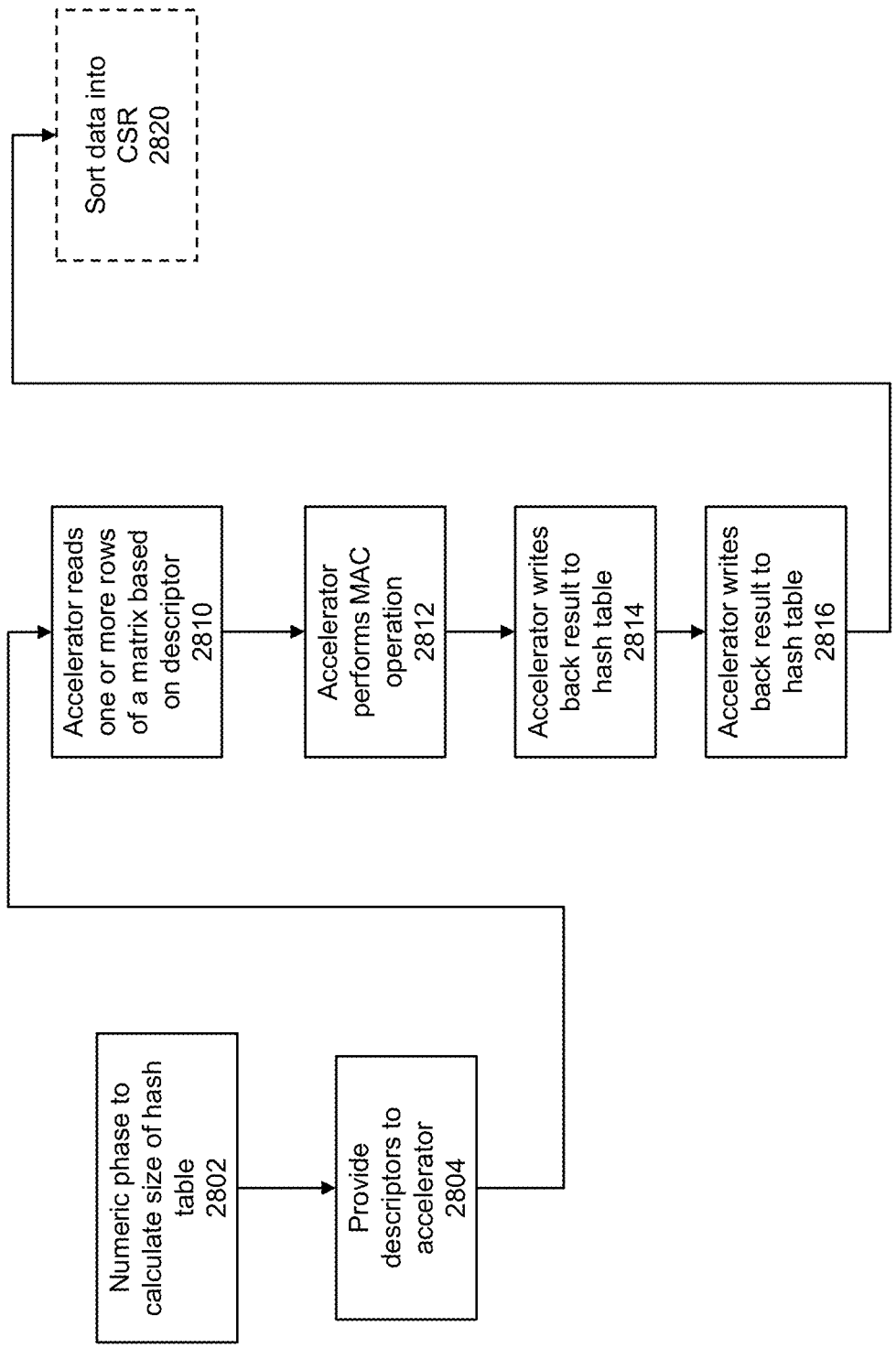
FIG. 28 depicts an example process.

FIG. 28 depicts an example process. The process can be performed by an offload engine in some examples. At 2802, a size of a hash table can be calculated by a process executed by a processor. For example, numeric phase can be used to determine a hash table size. At 2804, a process executed by the processor can generate and provide a descriptor to an accelerator. A descriptor can refer to a memory address of a batch of one or more rows of one matrix to multiply with a second matrix. At 2810, the accelerator can read one or more rows of a matrix based on a descriptor. For example, the accelerator can store the one or more rows into a row buffer for access. At 2812, the accelerator can read perform a sparse multiply-accumulate (MAC) operation involving rows of two matrices identified by the descriptor. At 2814, the accelerator can write back results from the MAC operation to a hash table. At 2820, optionally, the accelerator can transform one or more hash tables into CSR format. In some examples, a CPU-executed process can transform result matrix C into CSR format.

Figure 29:
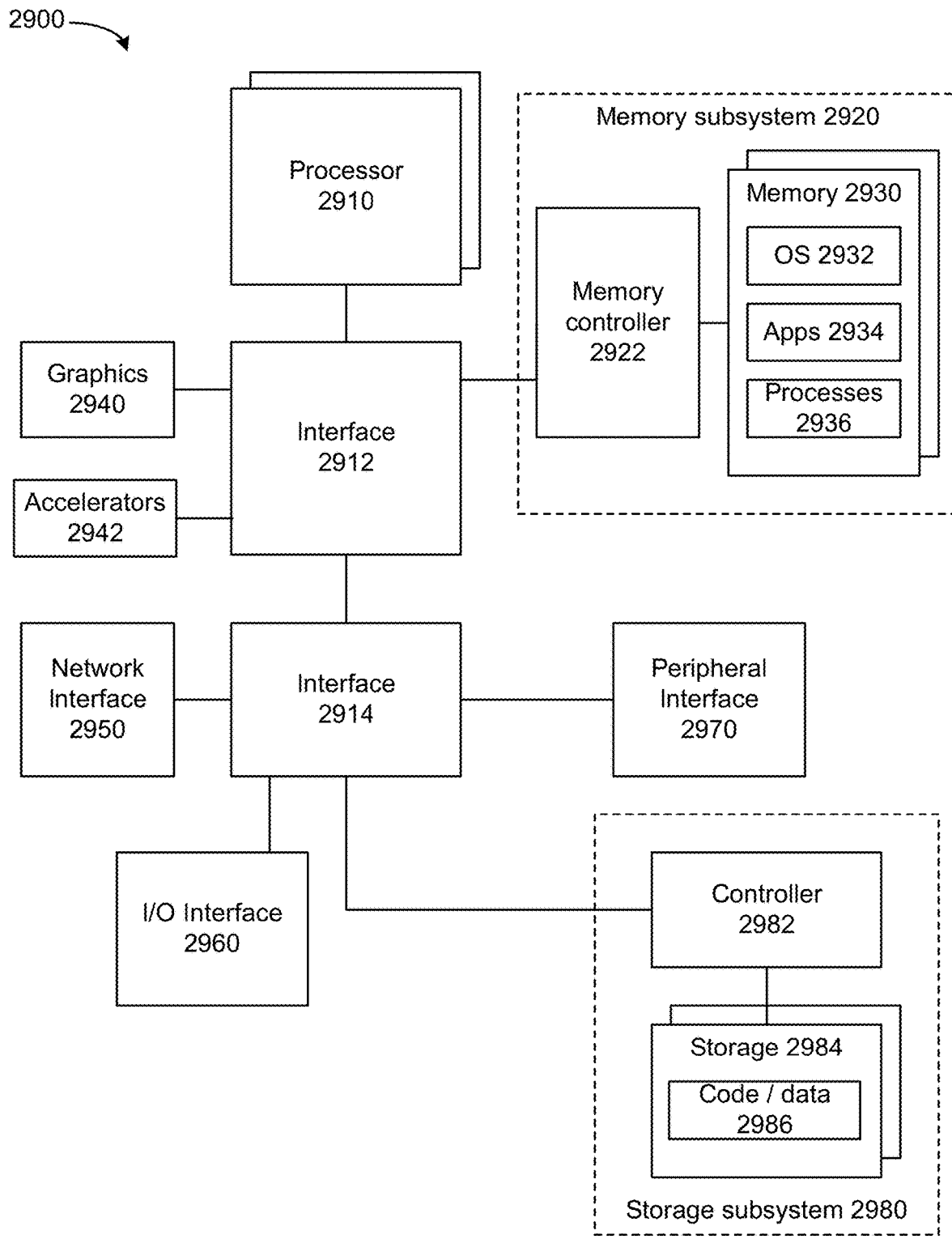
FIG. 29 depicts an example computing system.

FIG. 29 depicts an example computing system. Components of system 2900 (e.g., processor 2910, accelerators 2942, and so forth) to offload various operations to an offload engine among accelerators 2942, as described herein. System 2900 includes processor 2910, which provides processing, operation management, and execution of instructions for system 2900. Processor 2910 can include any type of microprocessor, central processing unit (CPU), graphics processing unit (GPU), processing core, or other processing hardware to provide processing for system 2900, or a combination of processors. Processor 2910 controls the overall operation of system 2900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2900 includes interface 2912 coupled to processor 2910, which can represent a higher speed interface or a high throughput interface for system components that needs higher bandwidth connections, such as memory subsystem 2920 or graphics interface components 2940, or accelerators 2942. Interface 2912 represents an interface circuit, which can be a standalone component or integrated onto a processor die. Where present, graphics interface 2940 interfaces to graphics components for providing a visual display to a user of system 2900. In one example, graphics interface 2940 can drive a high definition (HD) display that provides an output to a user. High definition can refer to a display having a pixel density of approximately 100 PPI (pixels per inch) or greater and can include formats such as full HD (e.g., 1080 p), retina displays, 4K (ultra-high definition or UHD), or others. In one example, the display can include a touchscreen display. In one example, graphics interface 2940 generates a display based on data stored in memory 2930 or based on operations executed by processor 2910 or both. In one example, graphics interface 2940 generates a display based on data stored in memory 2930 or based on operations executed by processor 2910 or both.

Accelerators 2942 can be a fixed function or programmable offload engine that can be accessed or used by a processor 2910. For example, an accelerator among accelerators 2942 can provide compression (DC) capability, cryptography services such as public key encryption (PKE), cipher, hash/authentication capabilities, decryption, or other capabilities or services. In some embodiments, in addition or alternatively, an accelerator among accelerators 2942 provides field select controller capabilities as described herein. In some cases, accelerators 2942 can be integrated into a CPU socket (e.g., a connector to a motherboard or circuit board that includes a CPU and provides an electrical interface with the CPU). For example, accelerators 2942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 2942 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

In some examples, one or more of accelerators 2942 can perform offloaded capabilities described herein.

Memory subsystem 2920 represents the main memory of system 2900 and provides storage for code to be executed by processor 2910, or data values to be used in executing a routine. Memory subsystem 2920 can include one or more memory devices 2930 such as read-only memory (ROM), flash memory, one or more varieties of random access memory (RAM) such as DRAM, or other memory devices, or a combination of such devices. Memory 2930 stores and hosts, among other things, operating system (OS) 2932 to provide a software platform for execution of instructions in system 2900. Additionally, applications 2934 can execute on the software platform of OS 2932 from memory 2930. Applications 2934 represent programs that have their own operational logic to perform execution of one or more functions. Processes 2936 represent agents or routines that provide auxiliary functions to OS 2932 or one or more applications 2934 or a combination. OS 2932, applications 2934, and processes 2936 provide software logic to provide functions for system 2900. In one example, memory subsystem 2920 includes memory controller 2922, which is a memory controller to generate and issue commands to memory 2930. It can be understood that memory controller 2922 could be a physical part of processor 2910 or a physical part of interface 2912. For example, memory controller 2922 can be an integrated memory controller, integrated onto a circuit with processor 2910.

In some examples, OS 2932 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on one or more processors sold or designed by Intel®, ARM®, AMD®, Qualcomm®, IBM®, Nvidia®, Broadcom®, Texas Instruments®, among others. In some examples, a driver can configure one or more of accelerators 2942 to perform offloaded operations, as described herein. A driver can advertise capability to processes and/or OS 2932 that one or more of accelerators 2942 to perform offloaded operations, as described herein. OS 2932 can cause driver to enable or disable offload to one or more of accelerators 2942 to perform offloaded operations, as described herein.

Applications 2934 and/or processes 2936 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

While not specifically illustrated, it will be understood that system 2900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 2900 includes interface 2914, which can be coupled to interface 2912. In one example, interface 2914 represents an interface circuit, which can include standalone components and integrated circuitry. In one example, multiple user interface components or peripheral components, or both, couple to interface 2914. Network interface 2950 provides system 2900 the ability to communicate with remote devices (e.g., servers or other computing devices) over one or more networks. Network interface 2950 can include an Ethernet adapter, wireless interconnection components, cellular network interconnection components, USB (universal serial bus), or other wired or wireless standards-based or proprietary interfaces. Network interface 2950 can transmit data to a device that is in the same data center or rack or a remote device, which can include sending data stored in memory.

Some examples of network interface 2950 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 2900 includes one or more input/output (I/O) interface(s) 2960. I/O interface 2960 can include one or more interface components through which a user interacts with system 2900 (e.g., audio, alphanumeric, tactile/touch, or other interfacing). Peripheral interface 2970 can include any hardware interface not specifically mentioned above. Peripherals refer generally to devices that connect dependently to system 2900. A dependent connection is one where system 2900 provides the software platform or hardware platform or both on which operation executes, and with which a user interacts.

In one example, system 2900 includes storage subsystem 2980 to store data in a nonvolatile manner. In one example, in certain system implementations, at least certain components of storage 2980 can overlap with components of memory subsystem 2920. Storage subsystem 2980 includes storage device(s) 2984, which can be or include any conventional medium for storing large amounts of data in a nonvolatile manner, such as one or more magnetic, solid state, or optical based disks, or a combination. Storage 2984 holds code or instructions and data 2986 in a persistent state (e.g., the value is retained despite interruption of power to system 2900). Storage 2984 can be generically considered to be a "memory," although memory 2930 is typically the executing or operating memory to provide instructions to processor 2910. Whereas storage 2984 is nonvolatile, memory 2930 can include volatile memory (e.g., the value or state of the data is indeterminate if power is interrupted to system 2900). In one example, storage subsystem 2980 includes controller 2982 to interface with storage 2984. In one example controller 2982 is a physical part of interface 2914 or processor 2910 or can include circuits or logic in both processor 2910 and interface 2914.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as those consistent with specifications from JEDEC (Joint Electronic Device Engineering Council) or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), a combination of one or more of the above, or other memory.

A power source (not depicted) provides power to the components of system 2900. More specifically, power source typically interfaces to one or multiple power supplies in system 2900 to provide power to the components of system 2900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: offload circuitry comprising one or more compute engines that are configurable to perform a workload offloaded from a process executed by a processor based on a descriptor particular to the workload, wherein the offload circuitry is configurable to perform the workload, among multiple different workloads, and wherein the multiple different workloads comprise one or more of: data transformation (DT) for data format conversion, Locality Sensitive Hashing (LSH) for neural network (NN), similarity search, sparse general matrix-matrix multiplication (SpGEMM) acceleration of hash based sparse matrix multiplication, data encode, data decode, or embedding lookup.

Example 2 includes one or more examples, wherein for a workload comprising DT for data format conversion, the descriptor format comprises: a pointer to a serialized string, address translation information, an address for an output, an address for a processing status, and/or a pointer to a transformation map.

Example 3 includes one or more examples, wherein for a workload comprising DT for data format conversion, the one or more compute engines perform in parallel: parse a transformation map to separate fields of data and provide the fields to processing queues for the one or more compute engines to perform data serialization or de-serialization.

Example 4 includes one or more examples, wherein for a workload comprising LSH for NN or similarity search, the descriptor format comprises: an address of a queried key, addresses of hash tables, and/or address of a result buffer.

Example 5 includes one or more examples, wherein for a workload comprising LSH for NN or similarity search, the one or more compute engines perform in parallel: determine a subset of candidates and compute one or more distances and perform candidate pruning to determine an integer K number of nearest neighbors.

Example 6 includes one or more examples, wherein for a workload comprising SpGEMM acceleration of hash based sparse matrix multiplication, for an operation of A×B=C, a descriptor format comprises one or more of: (1) metadata address of matrix A; (2) metadata address of matrix B; (3) address of hash table array to store a partial result; (4) start row identifier of matrix A to be processed; (5) end row identifier of matrix A to be processed; and/or (6) metadata address of matrix C.

Example 7 includes one or more examples, wherein for a workload comprising SpGEMM acceleration of hash based sparse matrix multiplication, the one or more compute engines perform in parallel: access a series of hash tables, walk the hash tables to determine an accumulated value, perform multiplication and accumulation on matrices, and provide a resulting output matrix.

Example 8 includes one or more examples, wherein for a workload comprising embedding lookup, the compute engines perform, in parallel, perform: embedding lookup operations, floating-point multiplication and addition, with scaling, or multiply-accumulate (MAC) to compute a product of two numbers and add the product to an accumulator.

Example 9 includes one or more examples, and includes the processor coupled to the offload circuitry, wherein the processor is to execute the process that offloaded the workload to the offload circuitry.

Example 10 includes one or more examples, and includes a server, wherein the server comprises the offload circuitry and the processor.

Example 11 includes one or more examples, and includes a datacenter, wherein the datacenter comprises the server and at least one memory pool and wherein the at least one memory pool comprises a second offload circuitry and a second processor.

Example 12 includes one or more examples, and includes a computer-readable medium comprising instructions stored thereon, that if executed by one or more processors, cause the one or more processors to: execute an operating system to provide capability to one or more processes to offload a workload to offload circuitry comprising one or more compute engines that are configurable to perform a workload offloaded from a process executed by a processor based on a descriptor particular to the workload, wherein the offload circuitry is configurable to perform the workload, among multiple different workloads, and wherein the multiple different workloads comprise one or more of: data transformation (DT) for data format conversion, Locality Sensitive Hashing (LSH) for neural network (NN), similarity search, sparse general matrix-matrix multiplication (SpGEMM) acceleration of hash based sparse matrix multiplication, data encode, data decode, or embedding lookup.

Example 13 includes one or more examples, wherein for a workload comprising DT for data format conversion, the descriptor format comprises: a pointer to a serialized string, address translation information, an address for an output, an address for a processing status, and/or a pointer to a transformation map.

Example 14 includes one or more examples, wherein for a workload comprising DT for data format conversion, the one or more compute engines perform in parallel: parse a transformation map to separate fields of data and provide the fields to processing queues for the one or more compute engines to perform data serialization or de-serialization.

Example 15 includes one or more examples, wherein for a workload comprising LSH for NN or similarity search, the descriptor format comprises: an address of a queried key, addresses of hash tables, and/or address of a result buffer.

Example 16 includes one or more examples, wherein for a workload comprising LSH for NN or similarity search, the one or more compute engines perform in parallel: determine a subset of candidates and compute one or more distances and perform candidate pruning to determine an integer K number of nearest neighbors.

Example 17 includes one or more examples, wherein for a workload comprising SpGEMM acceleration of hash based sparse matrix multiplication, for an operation of A×B=C, a descriptor format comprises one or more of: (1) metadata address of matrix A; (2) metadata address of matrix B; (3) address of hash table array to store a partial result; (4) start row identifier of matrix A to be processed; (5) end row identifier of matrix A to be processed; and/or (6) metadata address of matrix C.

Example 18 includes one or more examples, wherein for a workload comprising SpGEMM acceleration of hash based sparse matrix multiplication, the one or more compute engines perform in parallel: access a series of hash tables, walk the hash tables to determine an accumulated value, perform multiplication and accumulation on matrices, and provide a resulting output matrix.

Example 19 includes one or more examples, wherein for a workload comprising embedding lookup, the compute engines perform, in parallel, perform: embedding lookup operations, floating-point multiplication and addition, with scaling, or multiply-accumulate (MAC) to compute a product of two numbers and add the product to an accumulator.

Example 20 includes one or more examples, and includes a method comprising: offloading a workload to offload circuitry comprising one or more compute engines that are configurable to perform a workload offloaded from a process executed by a processor based on a descriptor particular to the workload, wherein the offload circuitry is configurable to perform the workload, among multiple different workloads, and wherein the multiple different workloads comprise one or more of: data transformation (DT) for data format conversion, Locality Sensitive Hashing (LSH) for neural network (NN), similarity search, sparse general matrix-matrix multiplication (SpGEMM) acceleration of hash based sparse matrix multiplication, data encode, data decode, or embedding lookup.

Example 21 includes one or more examples, wherein a descriptor associated with the workload configures the offload circuitry to perform the workload.

Example 22 includes one or more examples, and includes a memory device coupled to the offload circuitry, wherein the offload circuitry is to access data from the memory device.

Example 23 includes one or more examples, wherein the offload circuitry is to perform in-memory computation within one or more of: a cache, memory device, or memory pool.

Example 24 includes one or more examples, and includes the processor coupled to the offload circuitry, wherein the processor is to execute the process that offloaded the workload to the offload circuitry.

What is claimed is:

1. An apparatus comprising:
offload circuitry comprising one or more compute engines that are configurable to perform a workload offloaded from a process executed by a processor based on a descriptor particular to the workload, wherein the offload circuitry is configurable to perform the workload, among multiple different workloads, and wherein the multiple different workloads comprises:
sparse general matrix-matrix multiplication (SpGEMM) acceleration of hash based sparse matrix multiplication, wherein for a workload comprising SpGEMM acceleration of hash based sparse matrix multiplication, for an operation of A×B=C, a descriptor format comprises one or more of: (1) metadata address of matrix A; (2) metadata address of matrix B; (3) address of hash table array to store a partial result; (4) start row identifier of matrix A to be processed; (5) end row identifier of matrix A to be processed; and/or (6) metadata address of matrix C.

2. The apparatus of claim 1, wherein for a workload of the multiple different workloads that comprises data transformation (DT) for data format conversion, the descriptor format comprises: a pointer to a serialized string, address translation information, an address for an output, an address for a processing status, and/or a pointer to a transformation map.

3. The apparatus of claim 1, wherein for a workload of the multiple different workloads that comprises data transformation (DT) for data format conversion, the one or more compute engines perform in parallel:
parse a transformation map to separate fields of data and provide the fields to processing queues for the one or more compute engines to perform data serialization or de-serialization.

4. The apparatus of claim 1, wherein for a workload of the multiple different workloads comprising Locality Sensitive Hashing (LSH) for neural network (NN) or similarity search, the descriptor format comprises: an address of a queried key, addresses of hash tables, and/or address of a result buffer.

5. The apparatus of claim 1, wherein for a workload of the multiple different workloads comprising Locality Sensitive Hashing (LSH) for neural network (NN) or similarity search, the one or more compute engines perform in parallel:
determine a subset of candidates and compute one or more distances and
perform candidate pruning to determine an integer K number of nearest neighbors.

6. The apparatus of claim 1, wherein for the workload comprising SpGEMM acceleration of hash based sparse matrix multiplication, the one or more compute engines perform in parallel:
access a series of hash tables, walk the hash tables to determine an accumulated value, perform multiplication and accumulation on matrices, and provide a resulting output matrix.

7. The apparatus of claim 1, wherein for a workload of the multiple different workloads comprising embedding lookup, the compute engines perform, in parallel, perform:
embedding lookup operations, floating-point multiplication and addition, with scaling, or multiply-accumulate (MAC) to compute a product of two numbers and add the product to an accumulator.

8. The apparatus of claim 1, comprising the processor coupled to the offload circuitry, wherein the processor is to execute the process that offloaded the workload to the offload circuitry.

9. The apparatus of claim 8, comprising a server, wherein the server comprises the offload circuitry and the processor.

10. The apparatus of claim 9, comprising a datacenter, wherein the datacenter comprises the server and at least one memory pool and wherein the at least one memory pool comprises a second offload circuitry and a second processor.

11. The apparatus of claim 1, wherein the multiple different workloads also comprise one or more of: data transformation (DT) for data format conversion, Locality Sensitive Hashing (LSH) for neural network (NN), similarity search, data encode, data decode, or embedding lookup.

12. At least one non-transitory computer-readable medium comprising instructions stored thereon, that if executed by one or more processors, cause the one or more processors to:

execute an operating system to provide capability to one or more processes to offload a workload to offload circuitry comprising one or more compute engines that are configurable to perform a workload offloaded from a process executed by a processor based on a descriptor particular to the workload, wherein the offload circuitry is configurable to perform the workload, among multiple different workloads, and wherein the multiple different workloads comprises:

sparse general matrix-matrix multiplication (SpGEMM) acceleration of hash based sparse matrix multiplication, wherein for a workload comprising SpGEMM acceleration of hash based sparse matrix multiplication, for an operation of A×B=C, a descriptor format comprises one or more of: (1) metadata address of matrix A; (2) metadata address of matrix B; (3) address of hash table array to store a partial result; (4) start row identifier of matrix A to be processed; (5) end row identifier of matrix A to be processed; and/or (6) metadata address of matrix C.

13. The computer-readable medium of claim 12, wherein for a workload of the multiple different workloads that comprises data transformation (DT) for data format conversion, the descriptor format comprises: a pointer to a serialized string, address translation information, an address for an output, an address for a processing status, and/or a pointer to a transformation map.

14. The computer-readable medium of claim 12, wherein for a workload of the multiple different workloads that comprises data transformation (DT) for data format conversion, the one or more compute engines perform in parallel:

parse a transformation map to separate fields of data and provide the fields to processing queues for the one or more compute engines to perform data serialization or de-serialization.

15. The computer-readable medium of claim 12, wherein for a workload of the multiple different workloads comprising Locality Sensitive Hashing (LSH) for neural network (NN) or similarity search, the descriptor format comprises: an address of a queried key, addresses of hash tables, and/or address of a result buffer.

16. The computer-readable medium of claim 12, wherein for a workload of the multiple different workloads comprising Locality Sensitive Hashing (LSH) for neural network (NN) or similarity search, the one or more compute engines perform in parallel:

determine a subset of candidates and compute one or more distances and perform candidate pruning to determine an integer K number of nearest neighbors.

17. The computer-readable medium of claim 12, wherein for the workload comprising SpGEMM acceleration of hash based sparse matrix multiplication, the one or more compute engines perform in parallel:

access a series of hash tables, walk the hash tables to determine an accumulated value, perform multiplication and accumulation on matrices, and provide a resulting output matrix.

18. The computer-readable medium of claim 12, wherein for a workload of the multiple different workloads comprising embedding lookup, the compute engines perform, in parallel, perform:

embedding lookup operations, floating-point multiplication and addition, with scaling, or multiply-accumulate (MAC) to compute a product of two numbers and add the product to an accumulator.

19. The computer-readable medium of claim 12, wherein the multiple different workloads also comprise one or more of: data transformation (DT) for data format conversion, Locality Sensitive Hashing (LSH) for neural network (NN), similarity search, data encode, data decode, or embedding lookup.

20. A method comprising:

offloading a workload to offload circuitry comprising one or more compute engines that are configurable to perform a workload offloaded from a process executed by a processor based on a descriptor particular to the workload, wherein the offload circuitry is configurable to perform the workload, among multiple different workloads, and wherein the multiple different workloads comprises:

sparse general matrix-matrix multiplication (SpGEMM) acceleration of hash based sparse matrix multiplication, wherein for a workload comprising SpGEMM acceleration of hash based sparse matrix multiplication, for an operation of A×B=C, a descriptor format comprises one or more of: (1) metadata address of matrix A; (2) metadata address of matrix B; (3) address of hash table array to store a partial result; (4) start row identifier of matrix A to be processed; (5) end row identifier of matrix A to be processed; and/or (6) metadata address of matrix C.

21. The method of claim 20, wherein a descriptor associated with the workload configures the offload circuitry to perform the workload.

22. The method of claim 20, wherein the multiple different workloads also comprise one or more of: data transformation (DT) for data format conversion, Locality Sensitive Hashing (LSH) for neural network (NN), similarity search, data encode, data decode, or embedding lookup.

* * * * *